Feb. 2, 1960   C. B. HARKER   2,923,112
MACHINE FOR FILLING AND CLOSING CARTONS
Filed Dec. 1, 1954   27 Sheets-Sheet 7
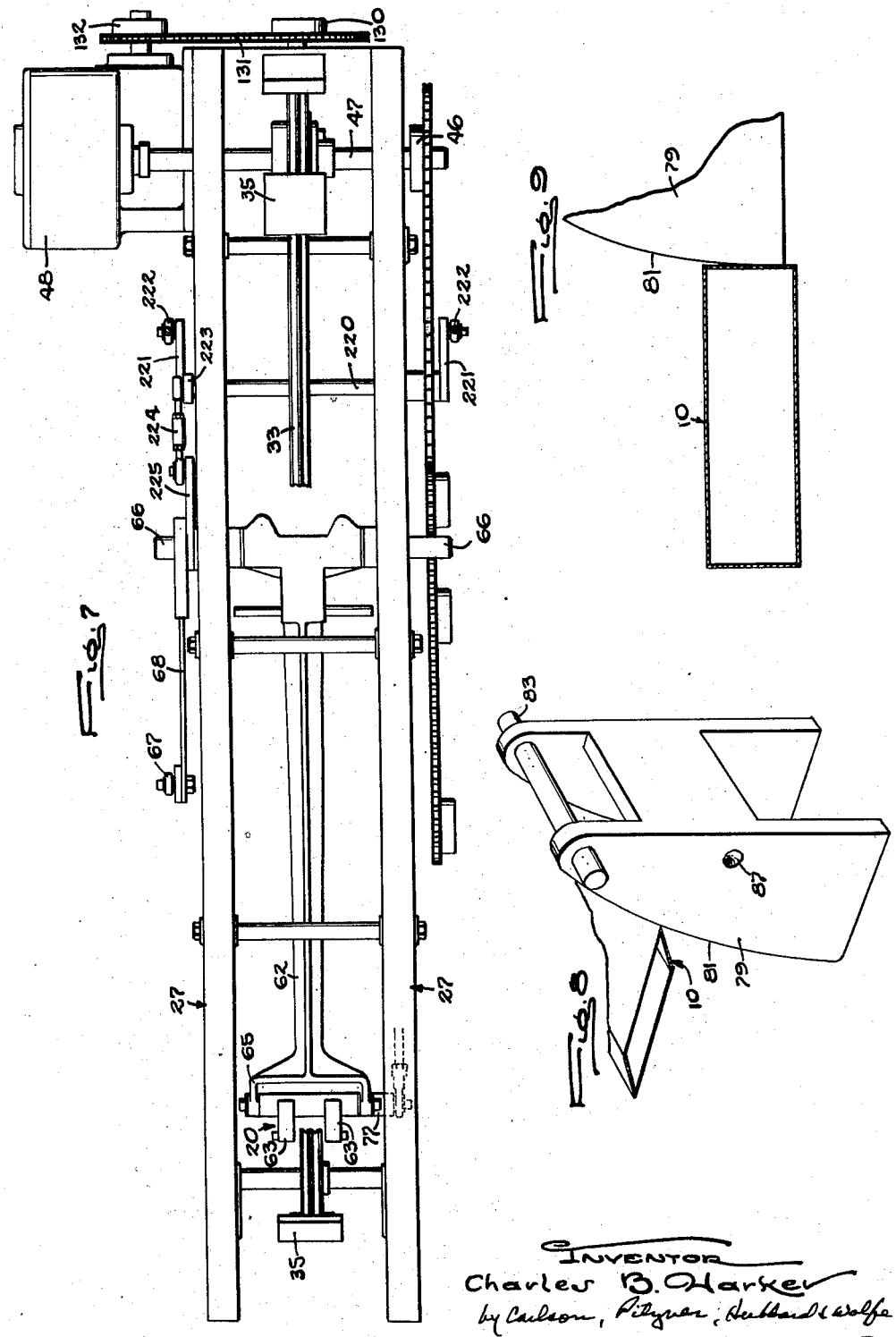

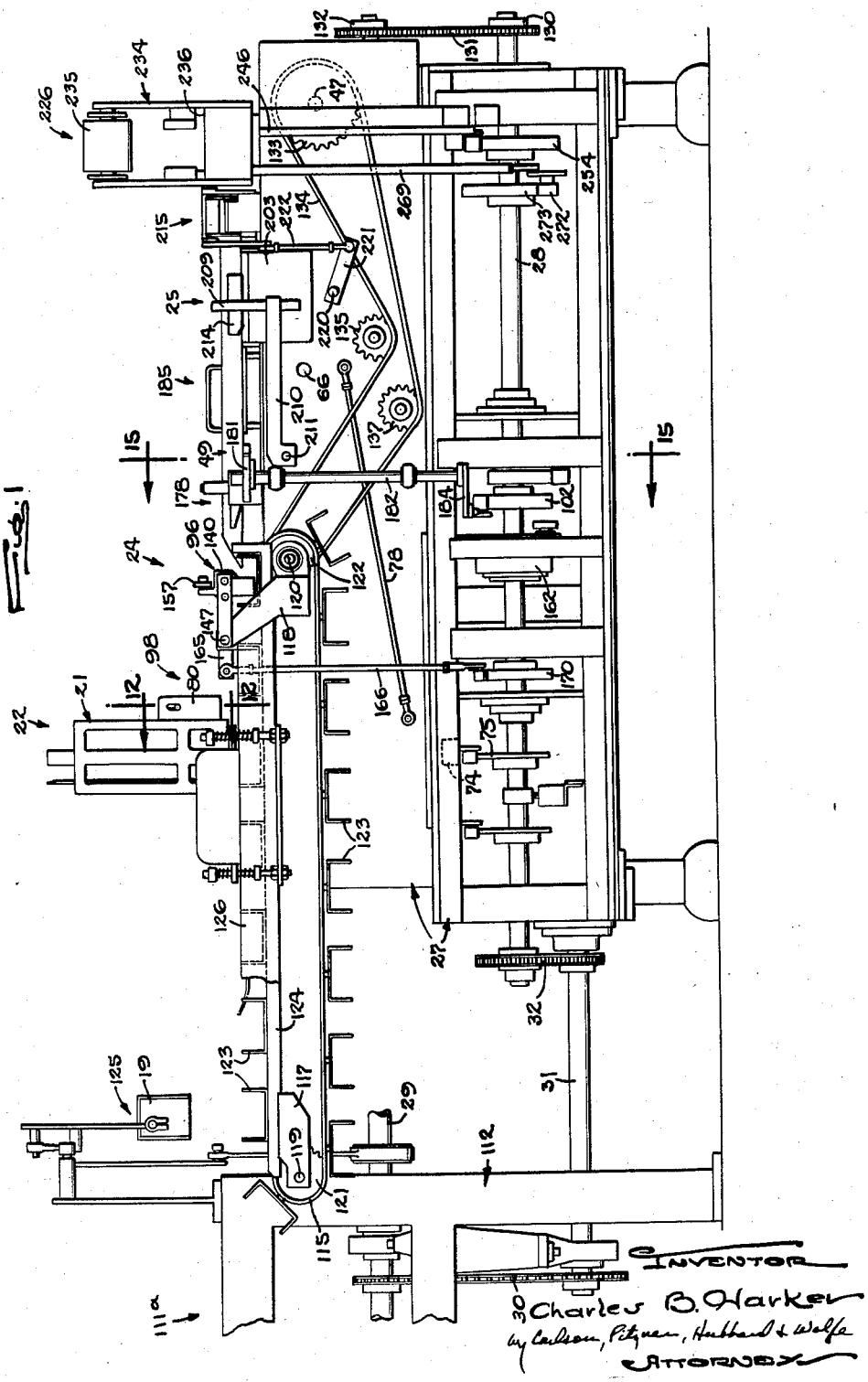

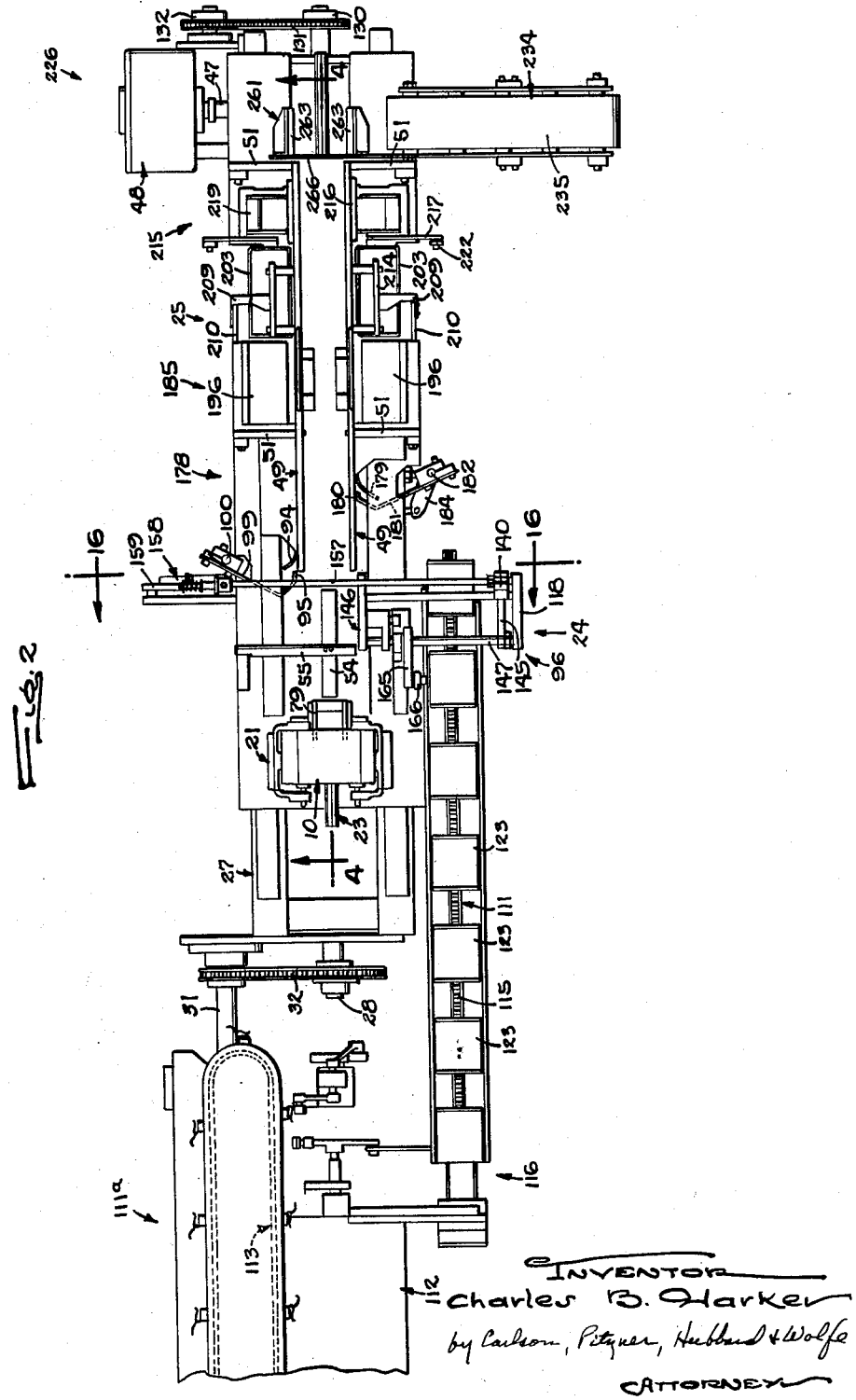

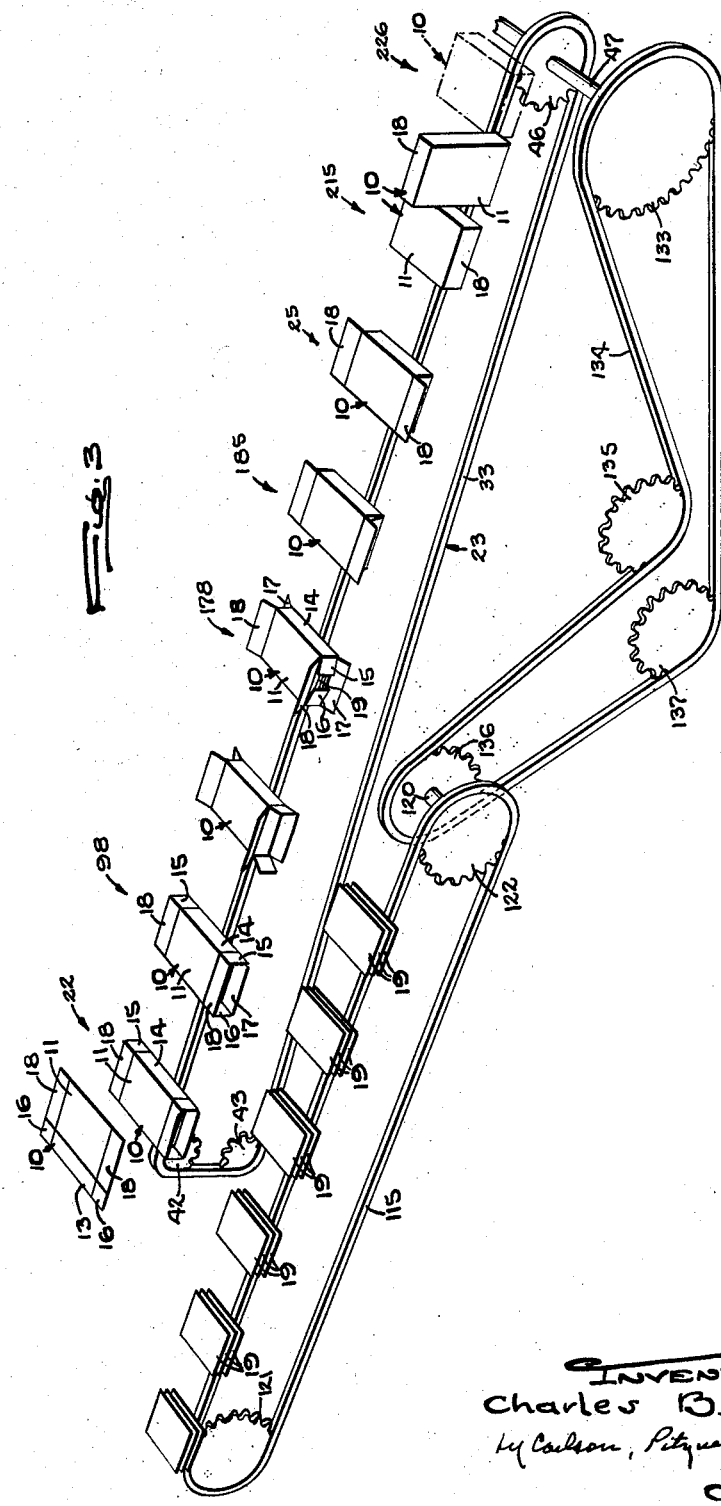

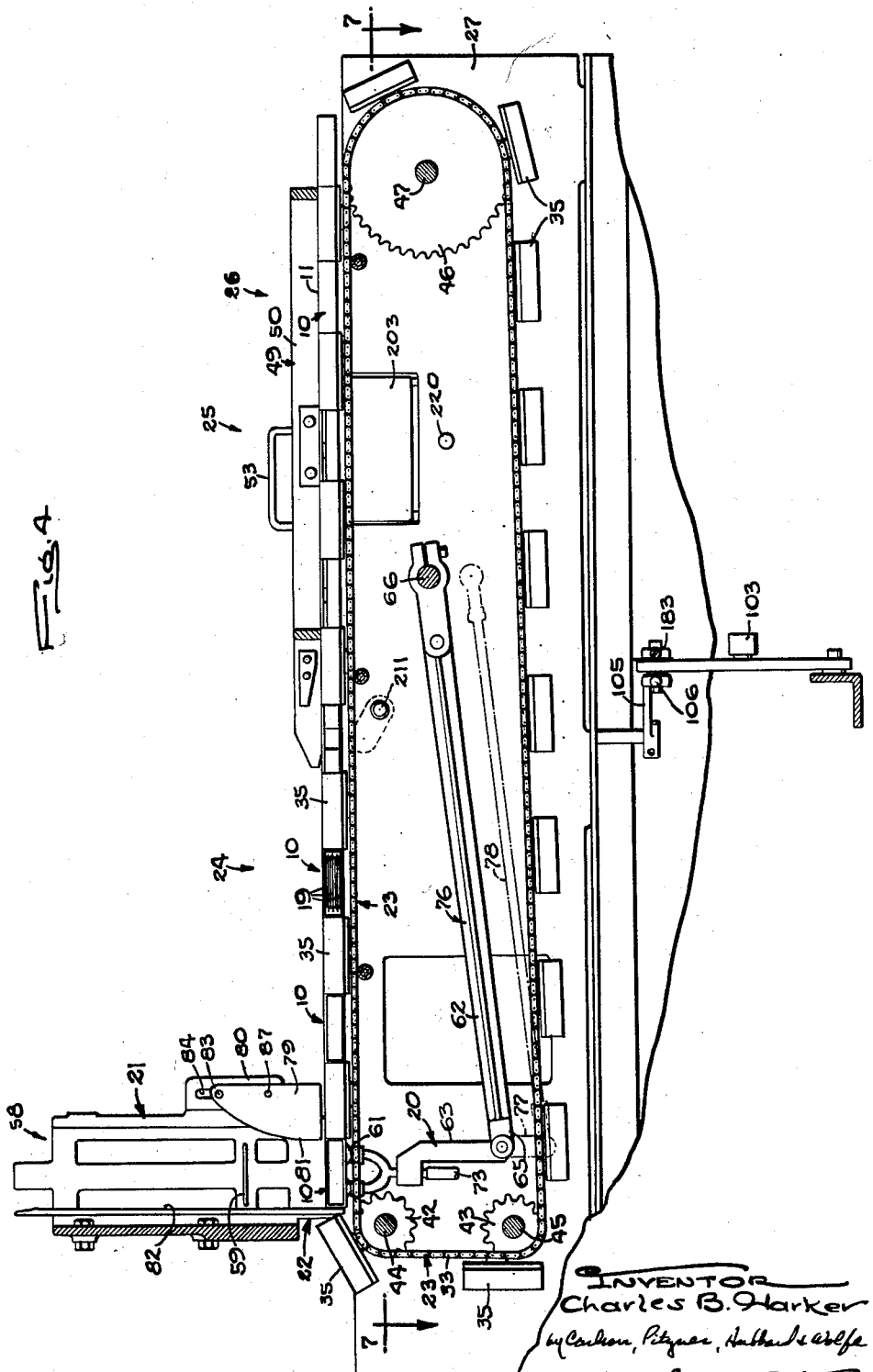

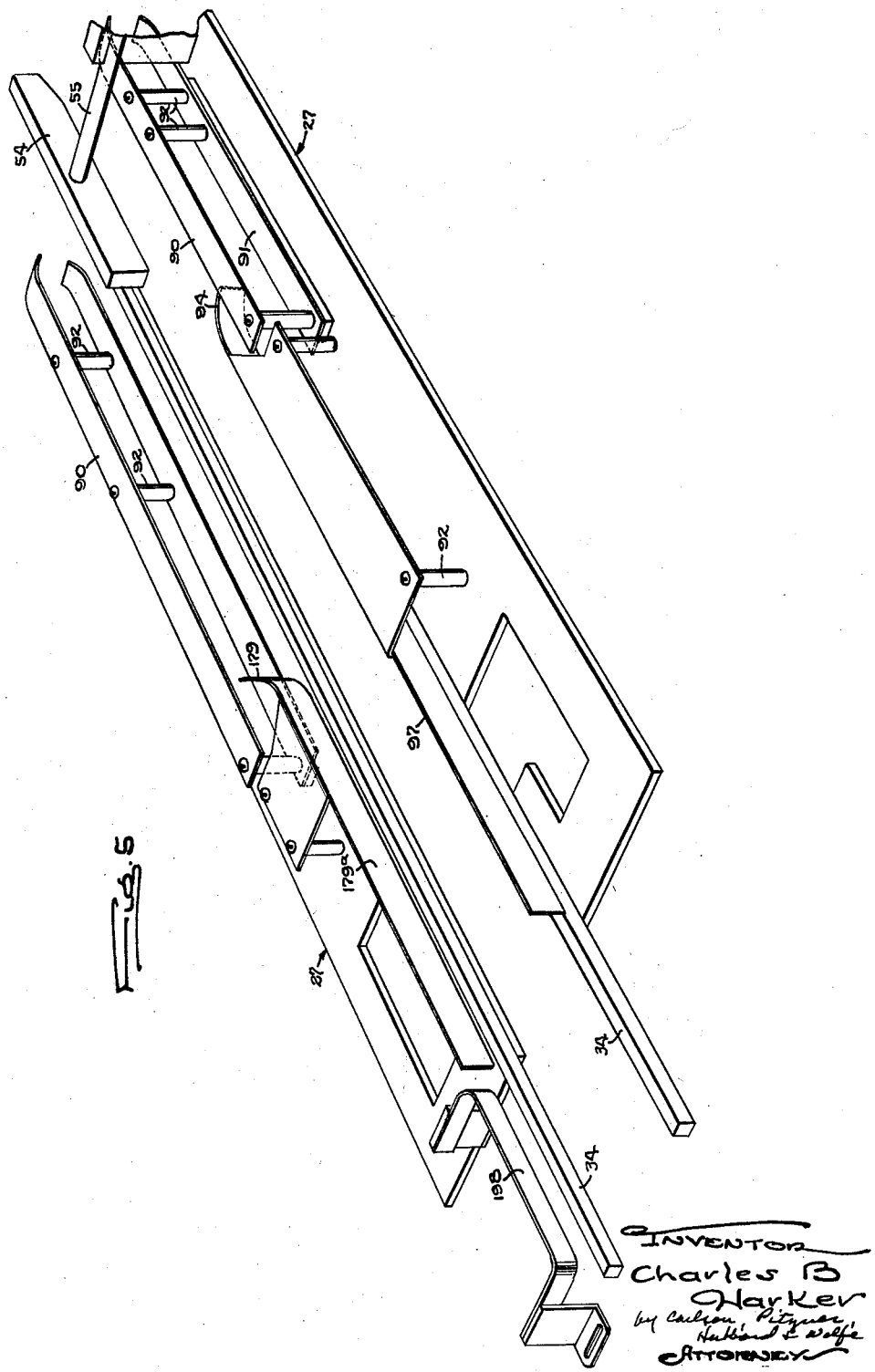

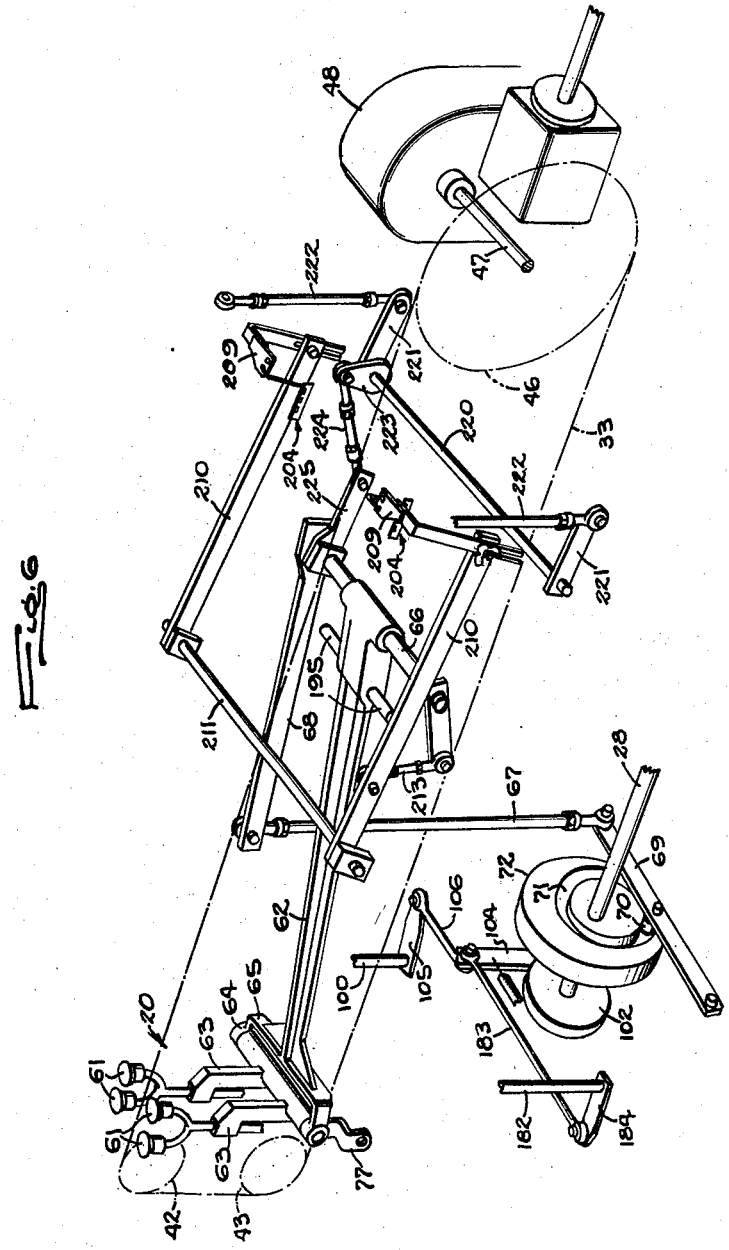

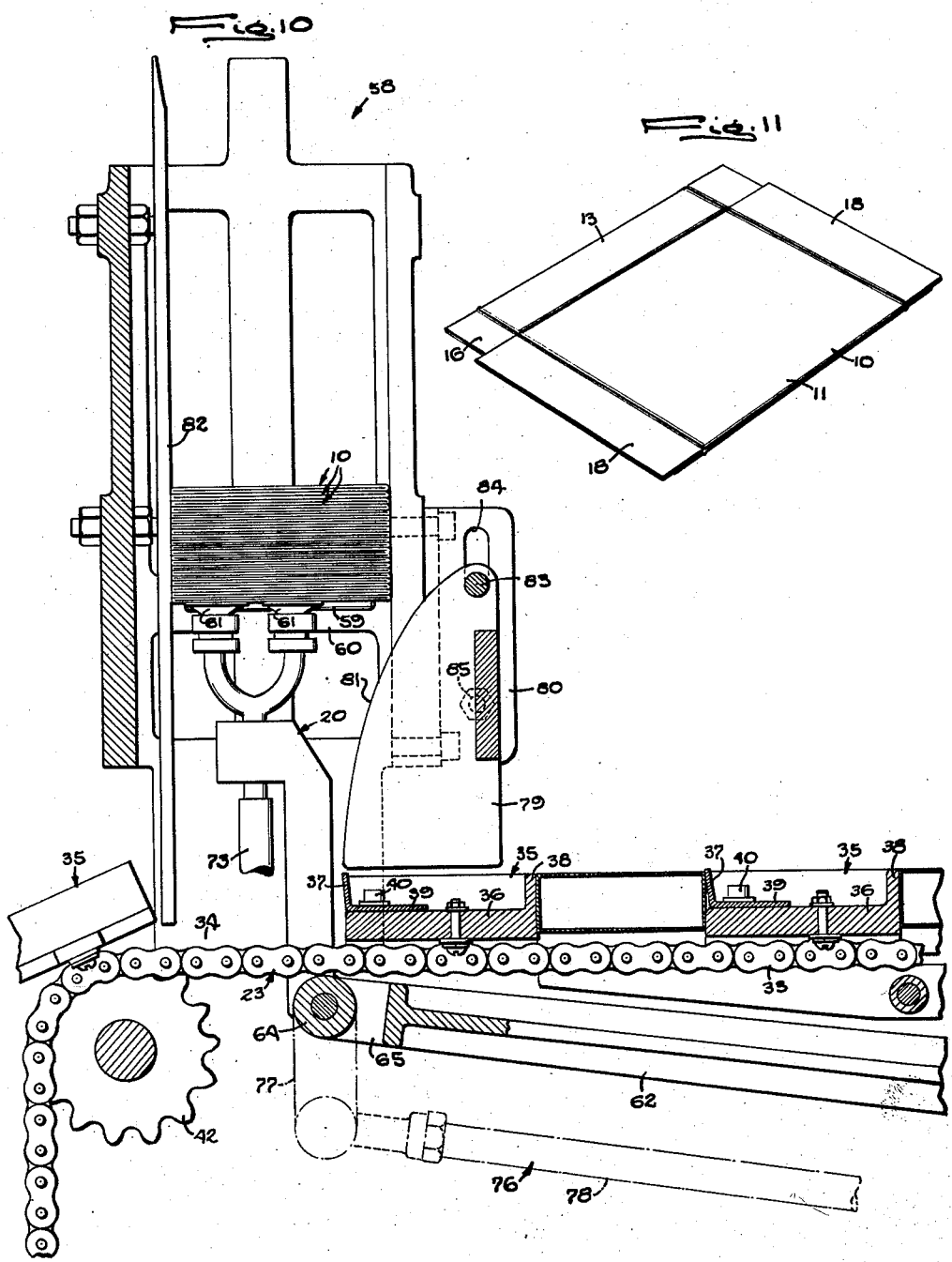

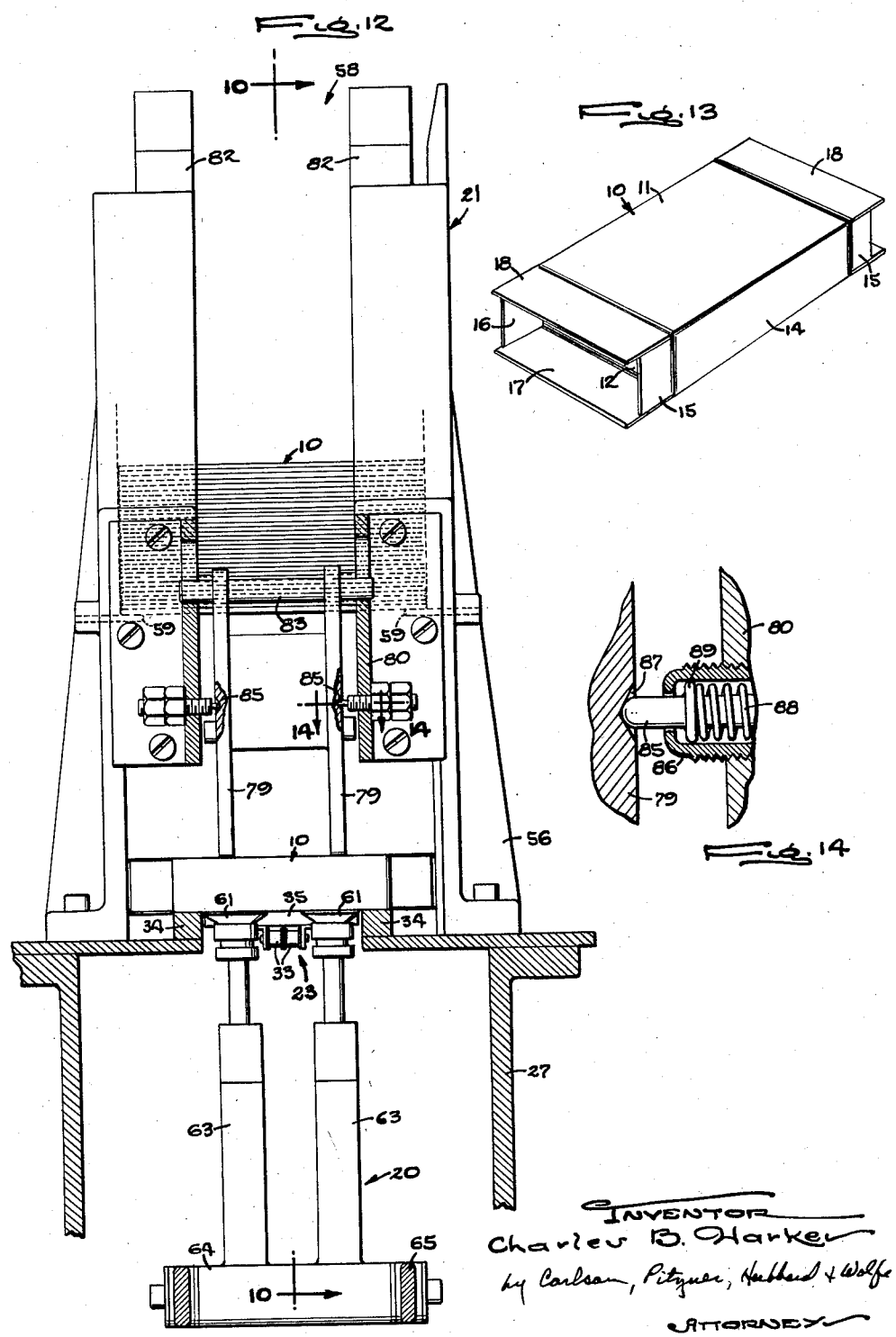

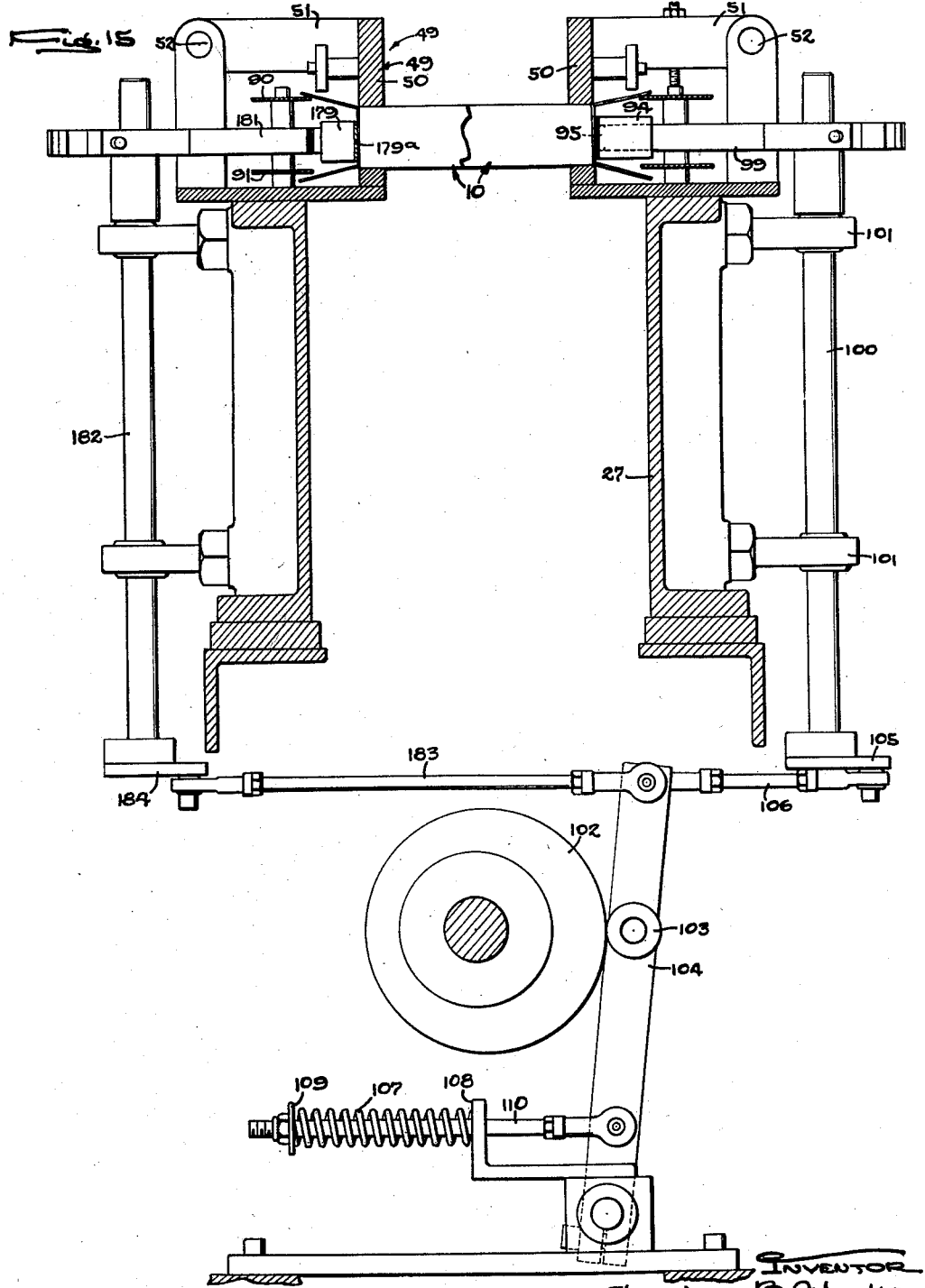

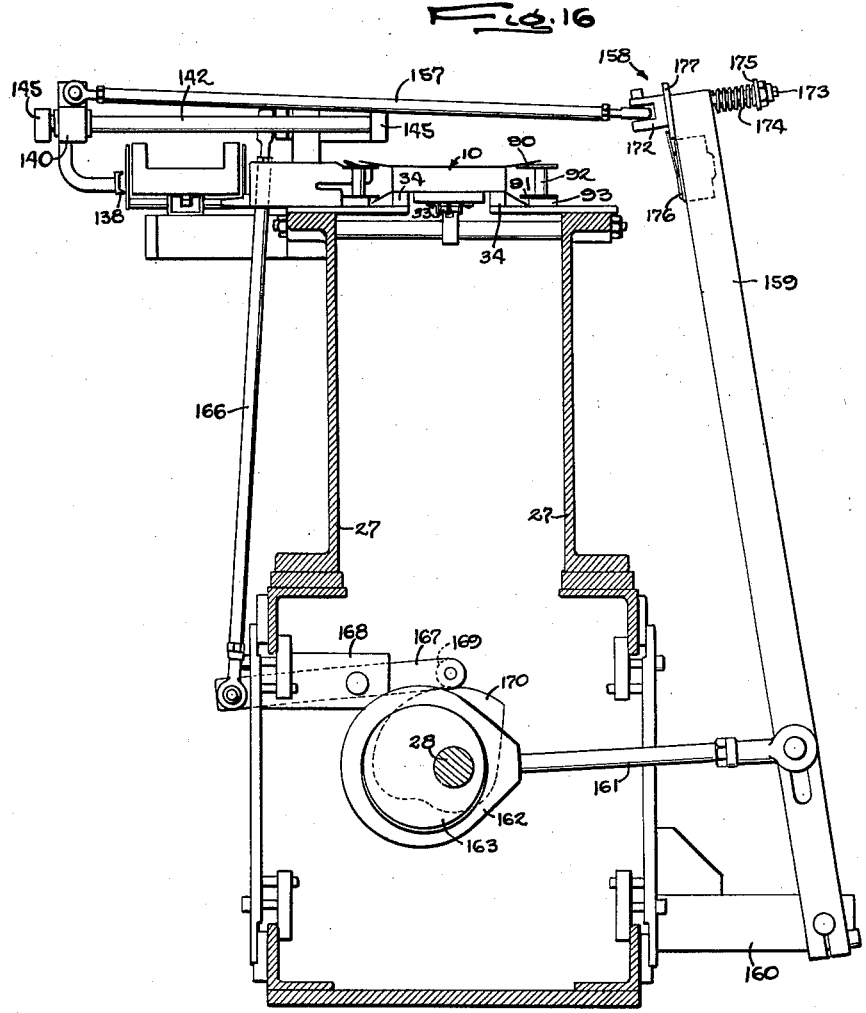

Feb. 2, 1960  C. B. HARKER  2,923,112
MACHINE FOR FILLING AND CLOSING CARTONS
Filed Dec. 1, 1954  27 Sheets-Sheet 12
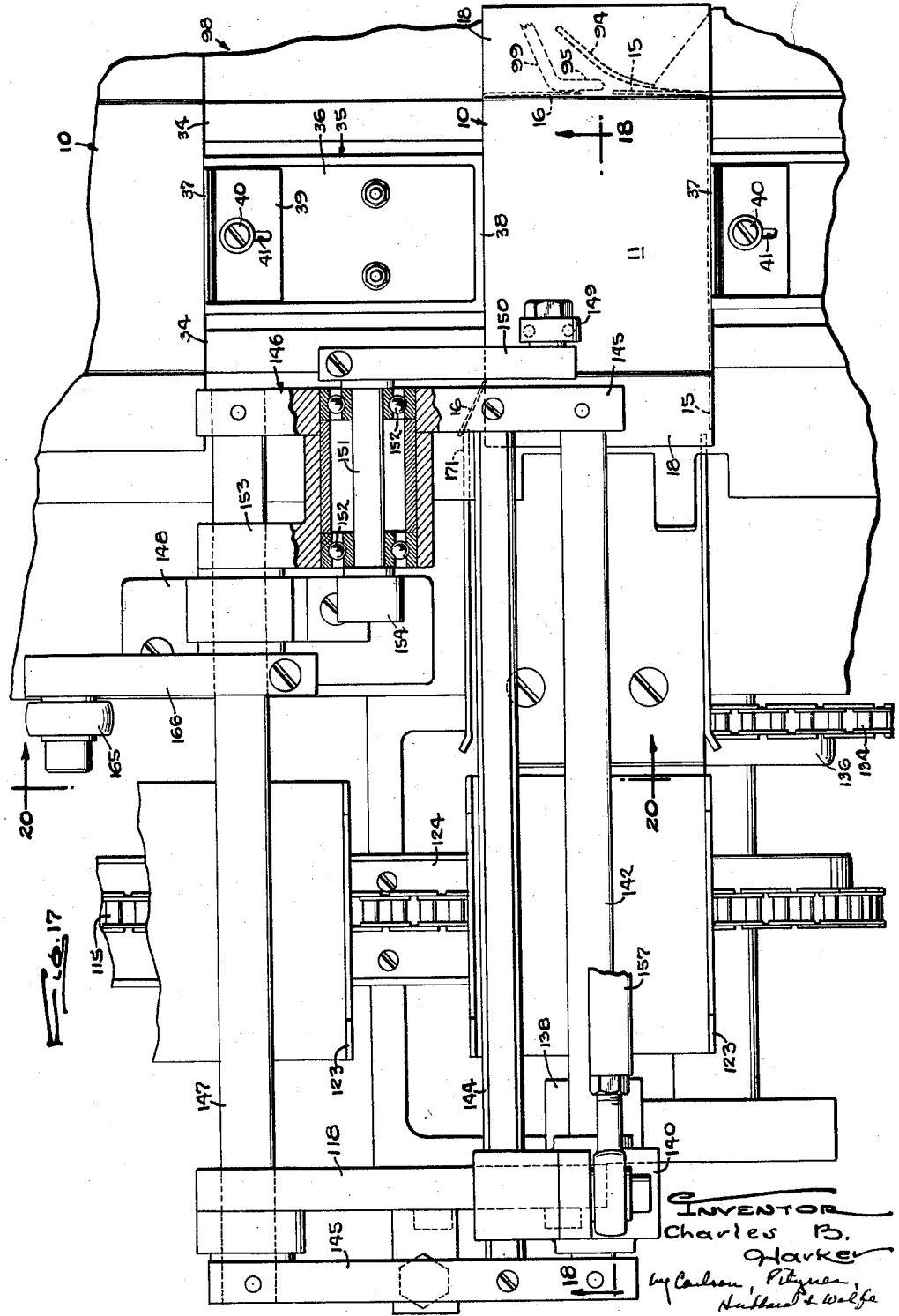
INVENTOR
Charles B. Harker
by Carlson, Pitzner, Hubbard & Wolfe
ATTORNEYS Feb. 2, 1960 C. B. HARKER 2,923,112
MACHINE FOR FILLING AND CLOSING CARTONS
Filed Dec. 1, 1954 27 Sheets-Sheet 13
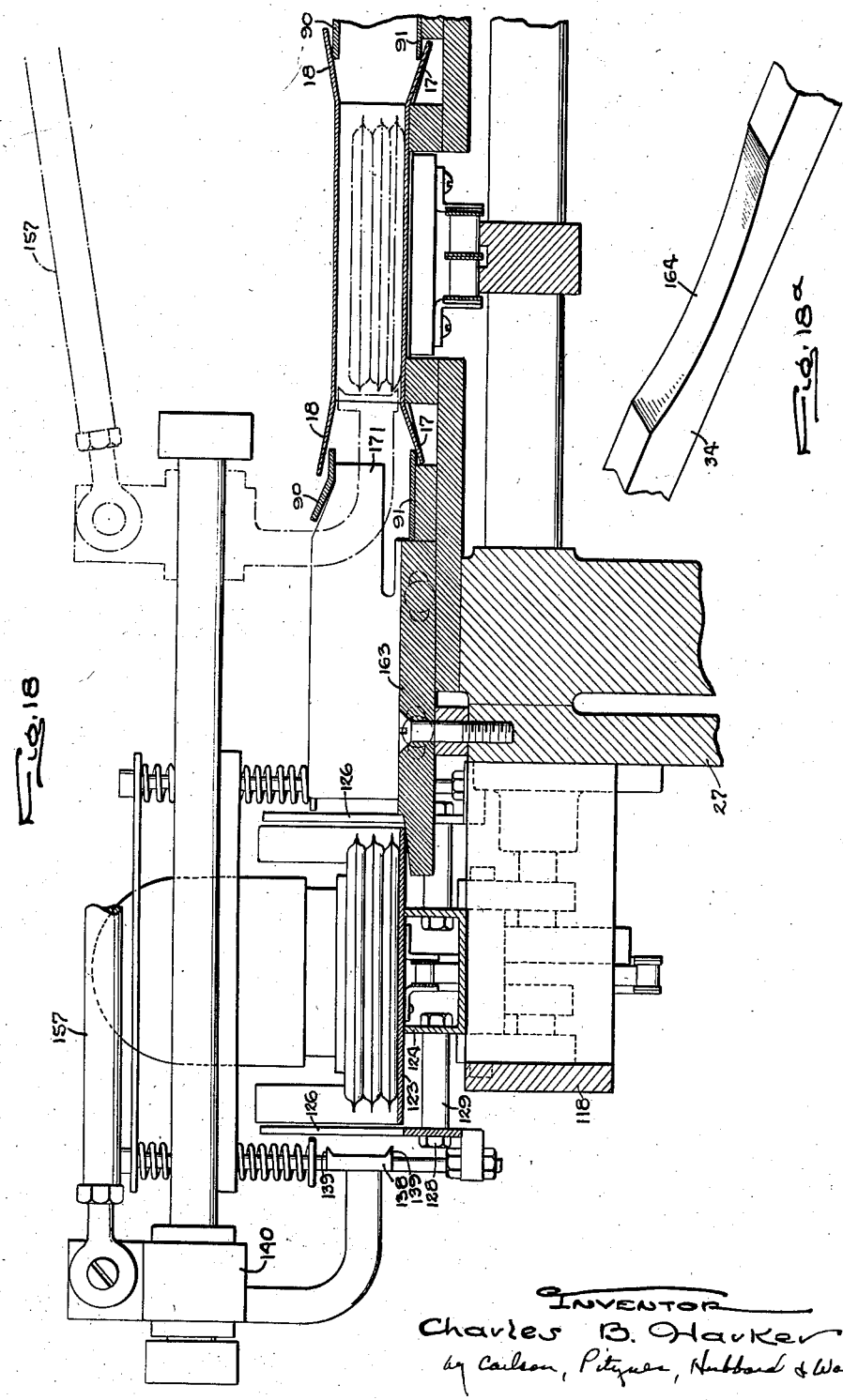

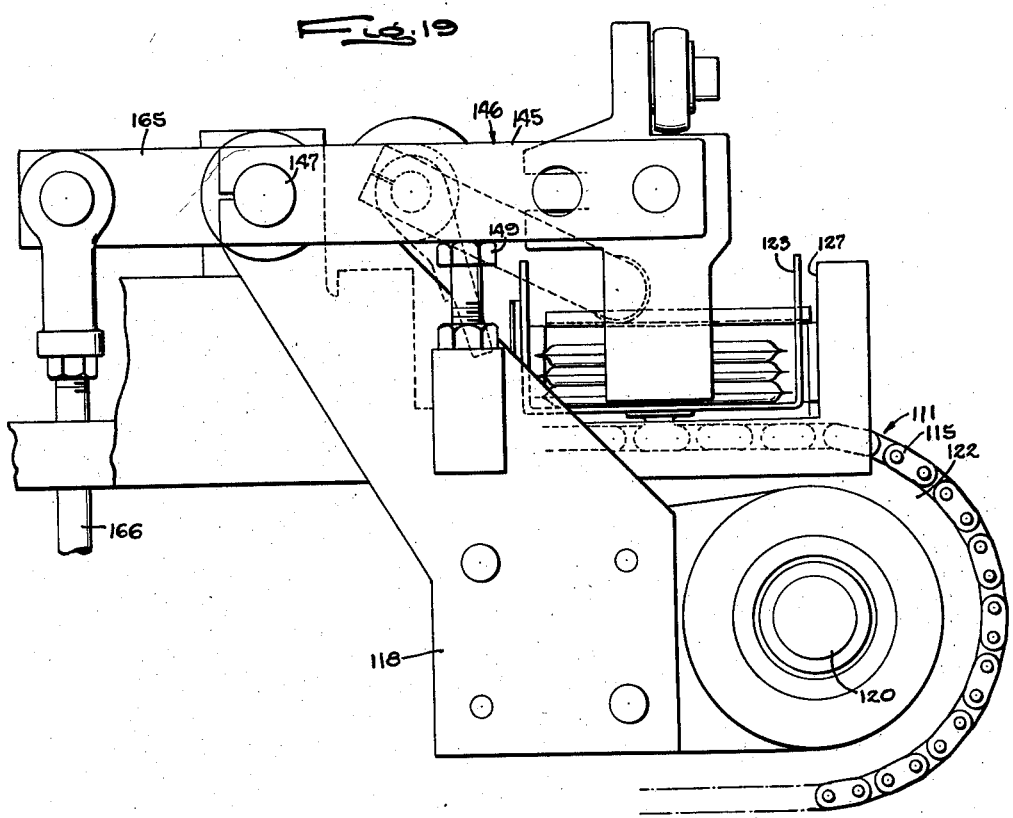
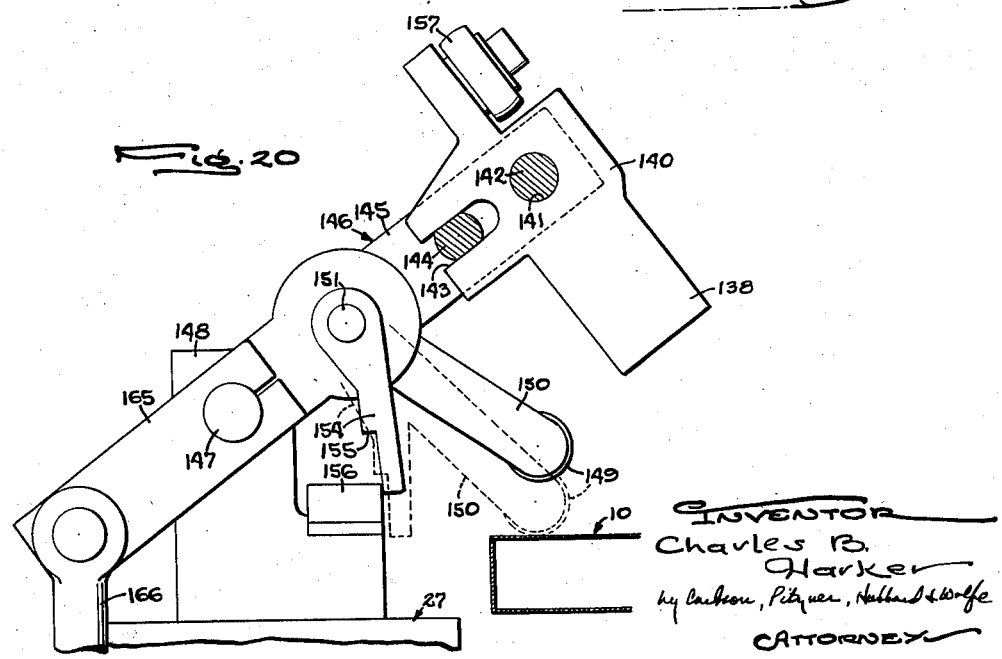

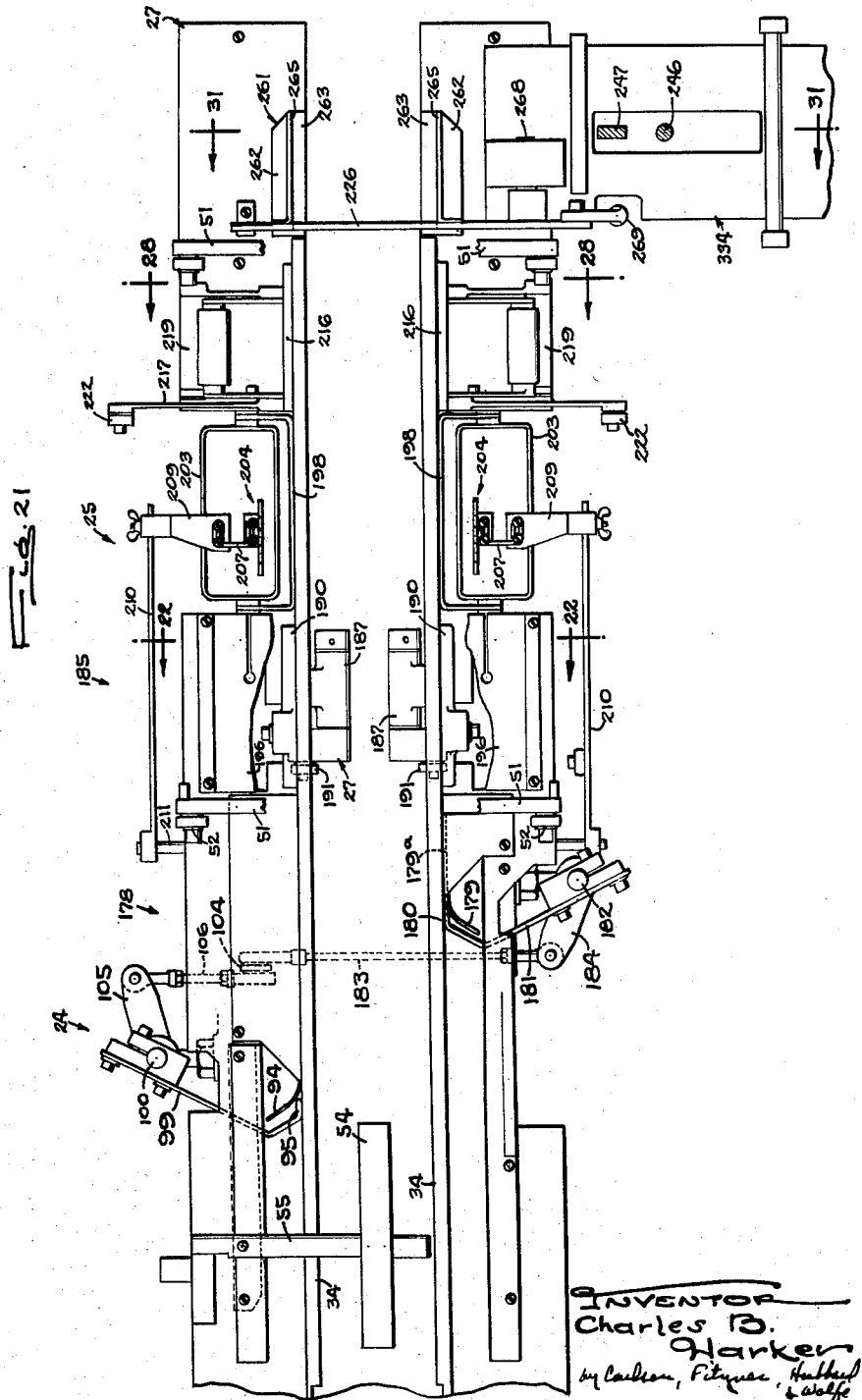

Feb. 2, 1960  C. B. HARKER  2,923,112
MACHINE FOR FILLING AND CLOSING CARTONS
Filed Dec. 1, 1954  27 Sheets-Sheet 16
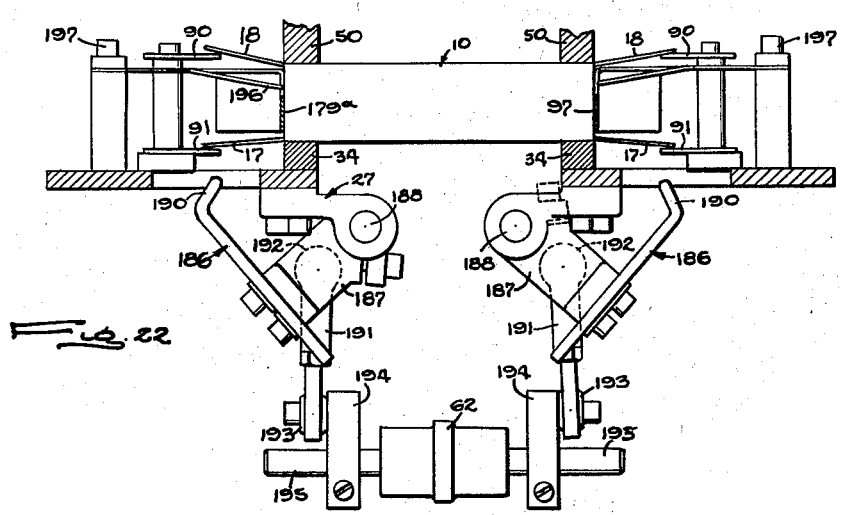
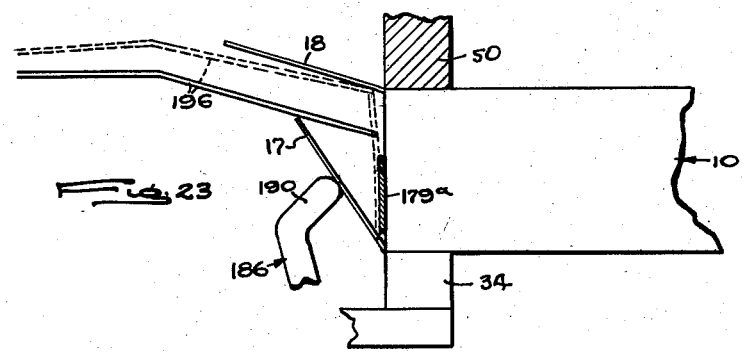
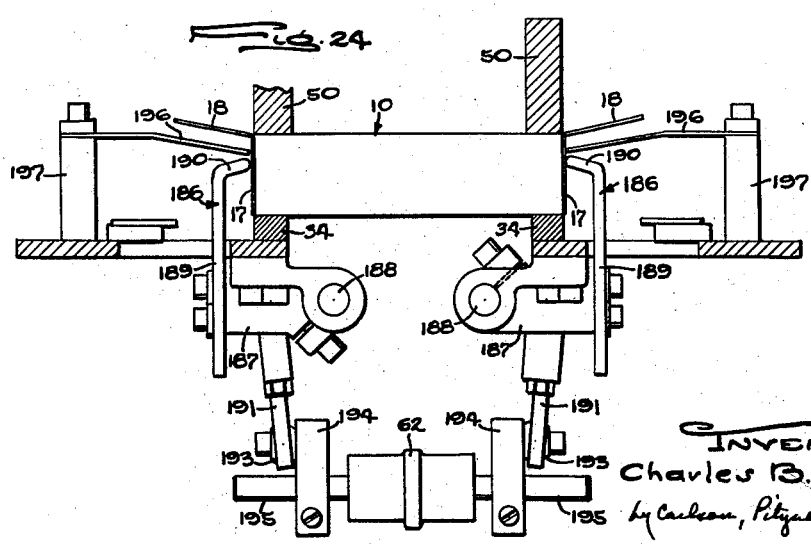
INVENTOR
Charles B. Harker
by Carlson, Pityner, Hubbard & Wolfe
ATTORNEY

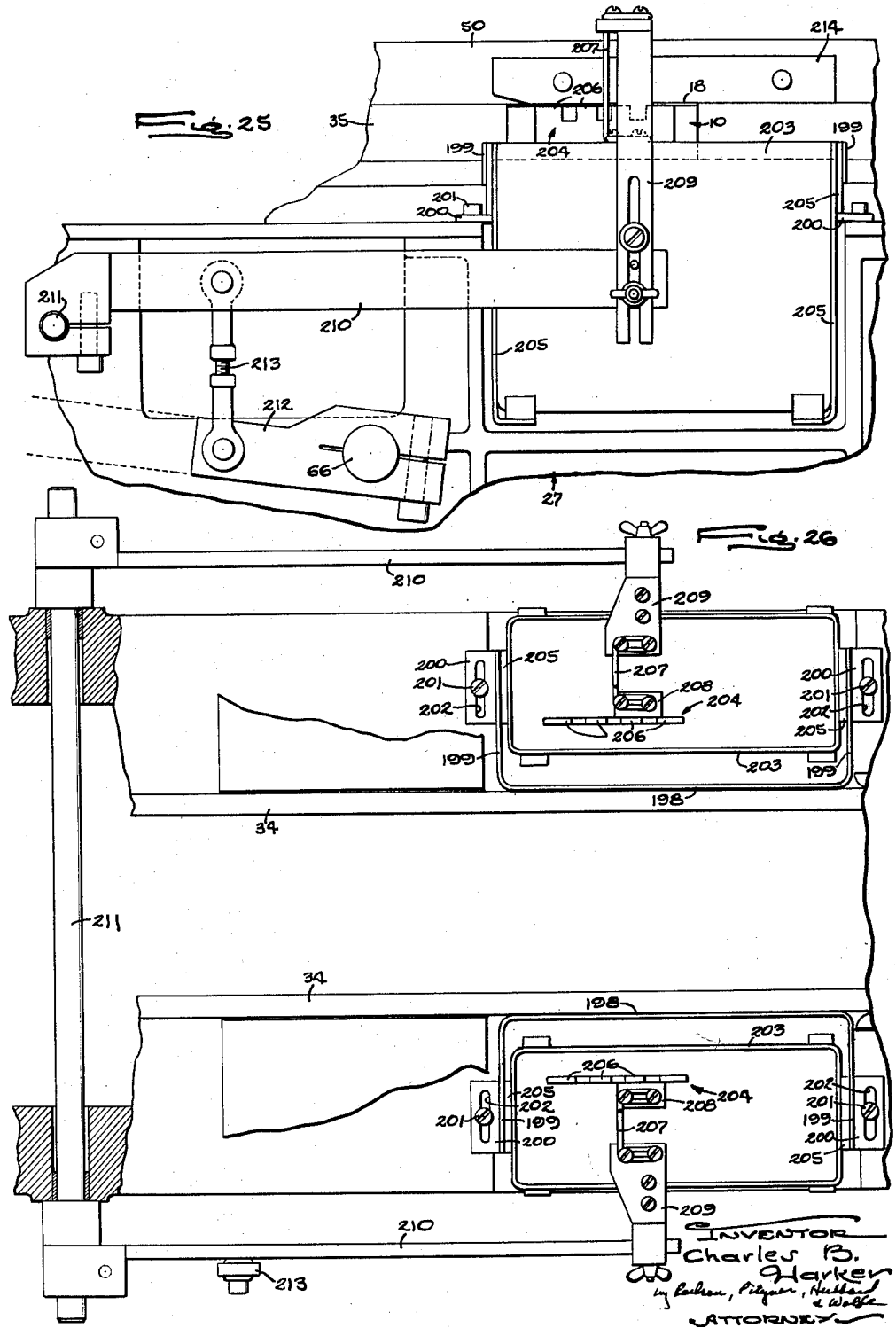

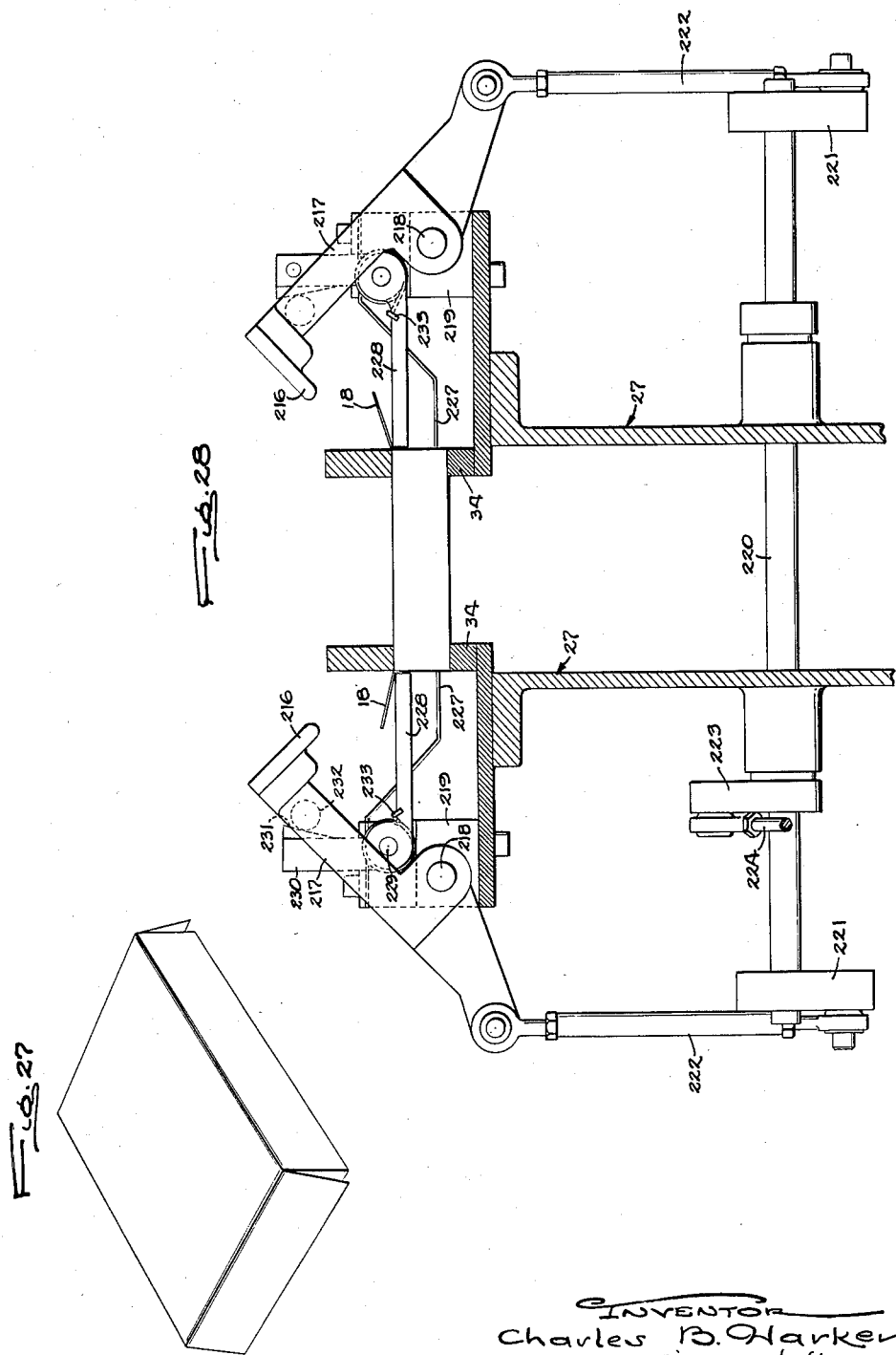

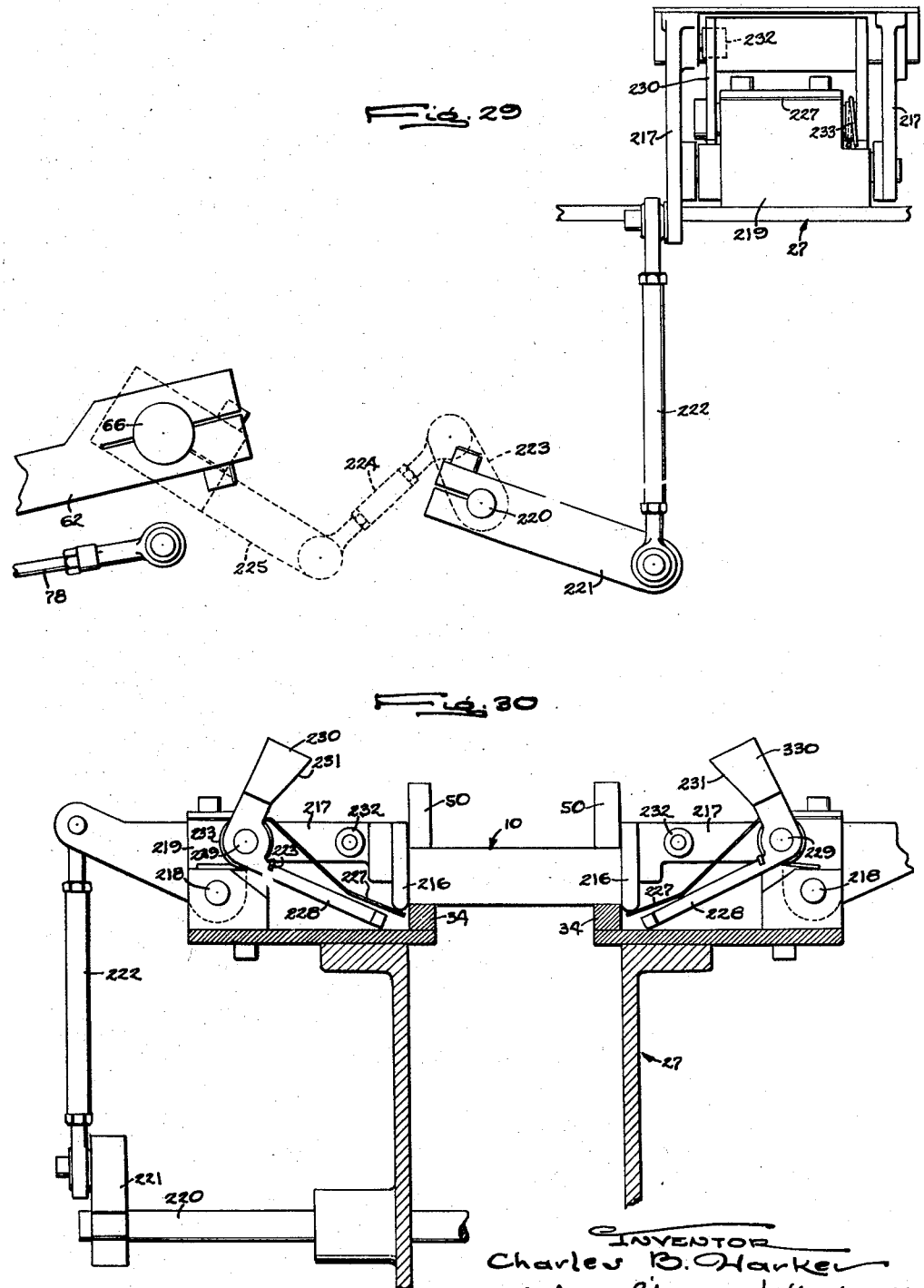

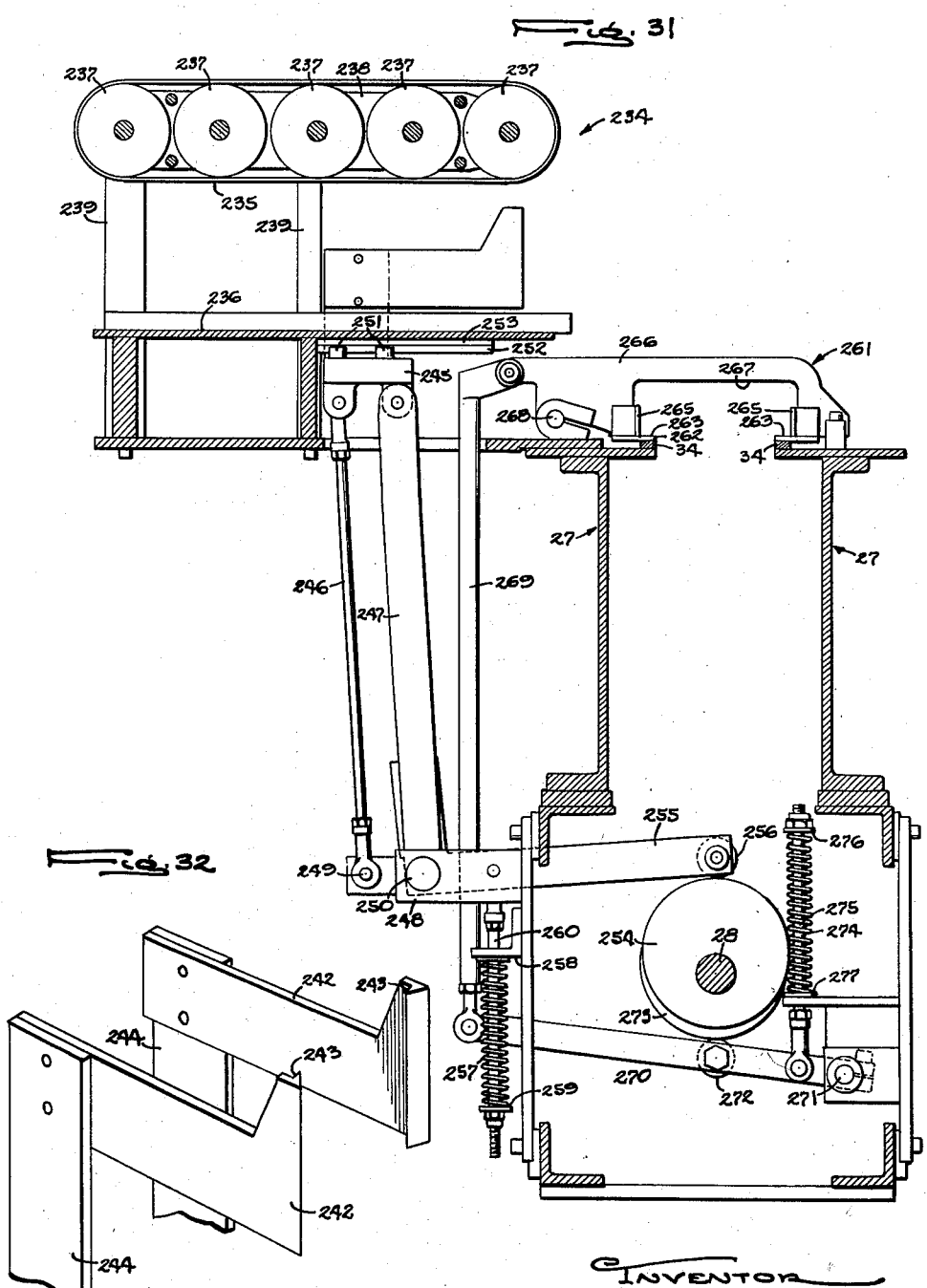

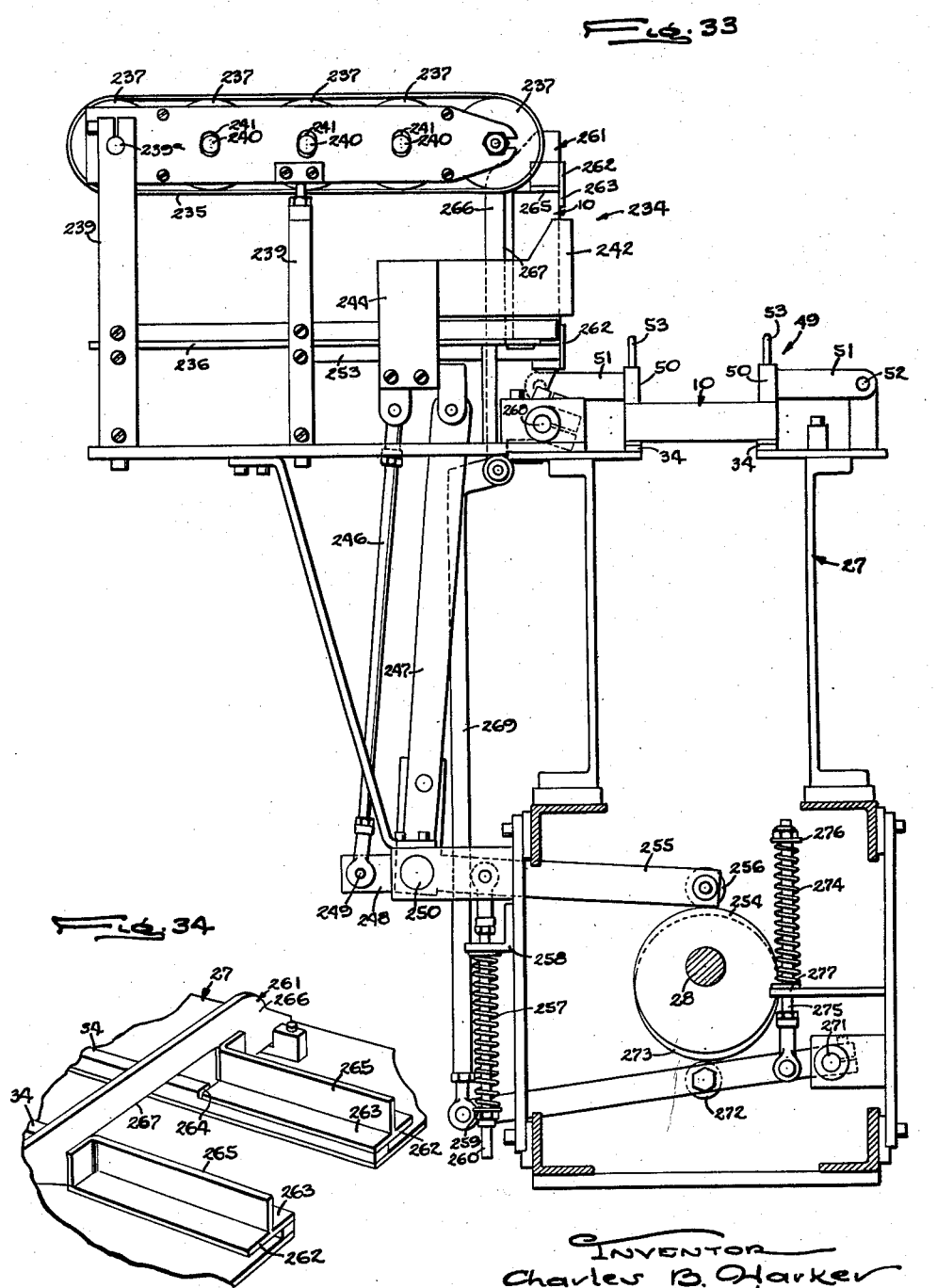

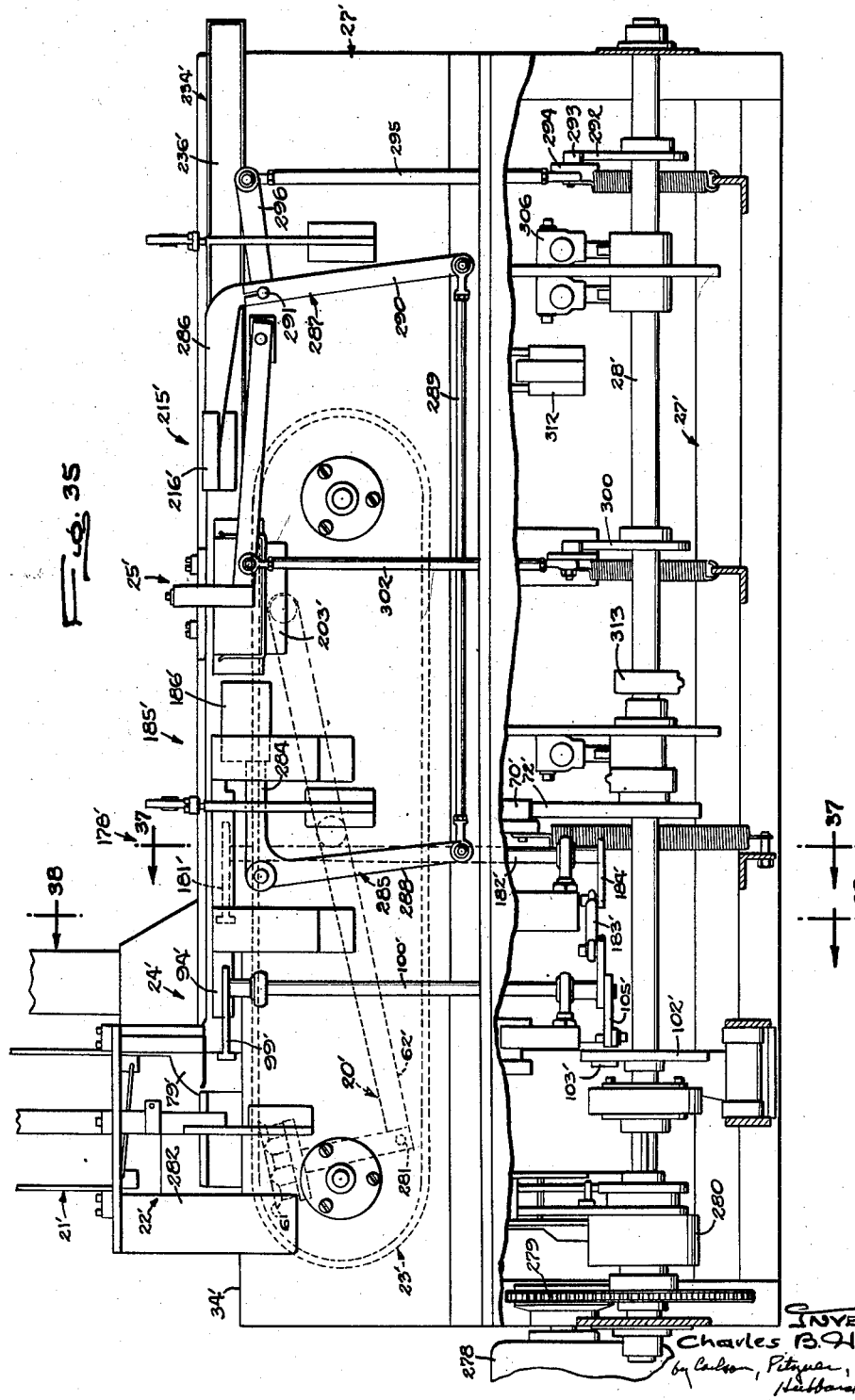

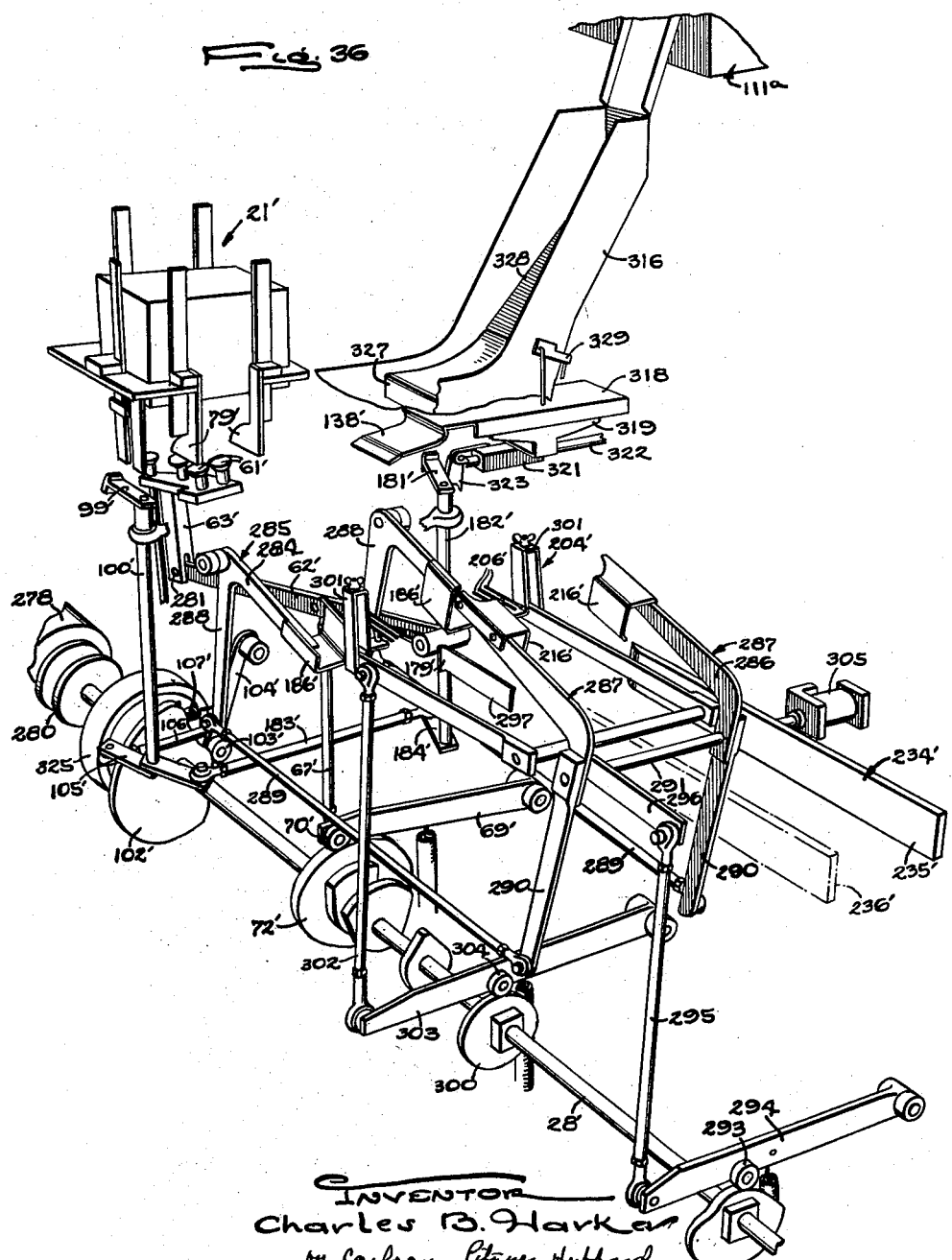

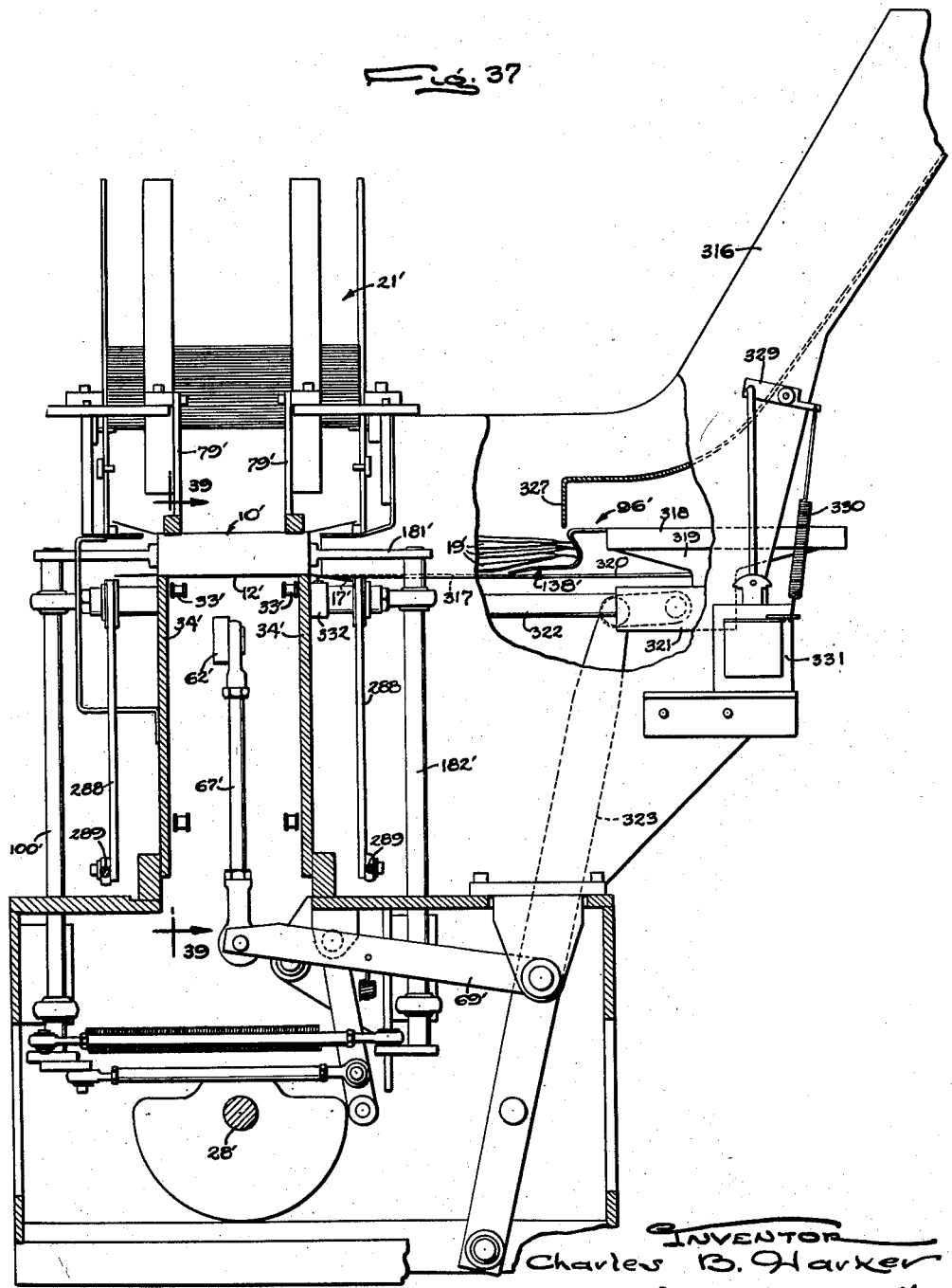

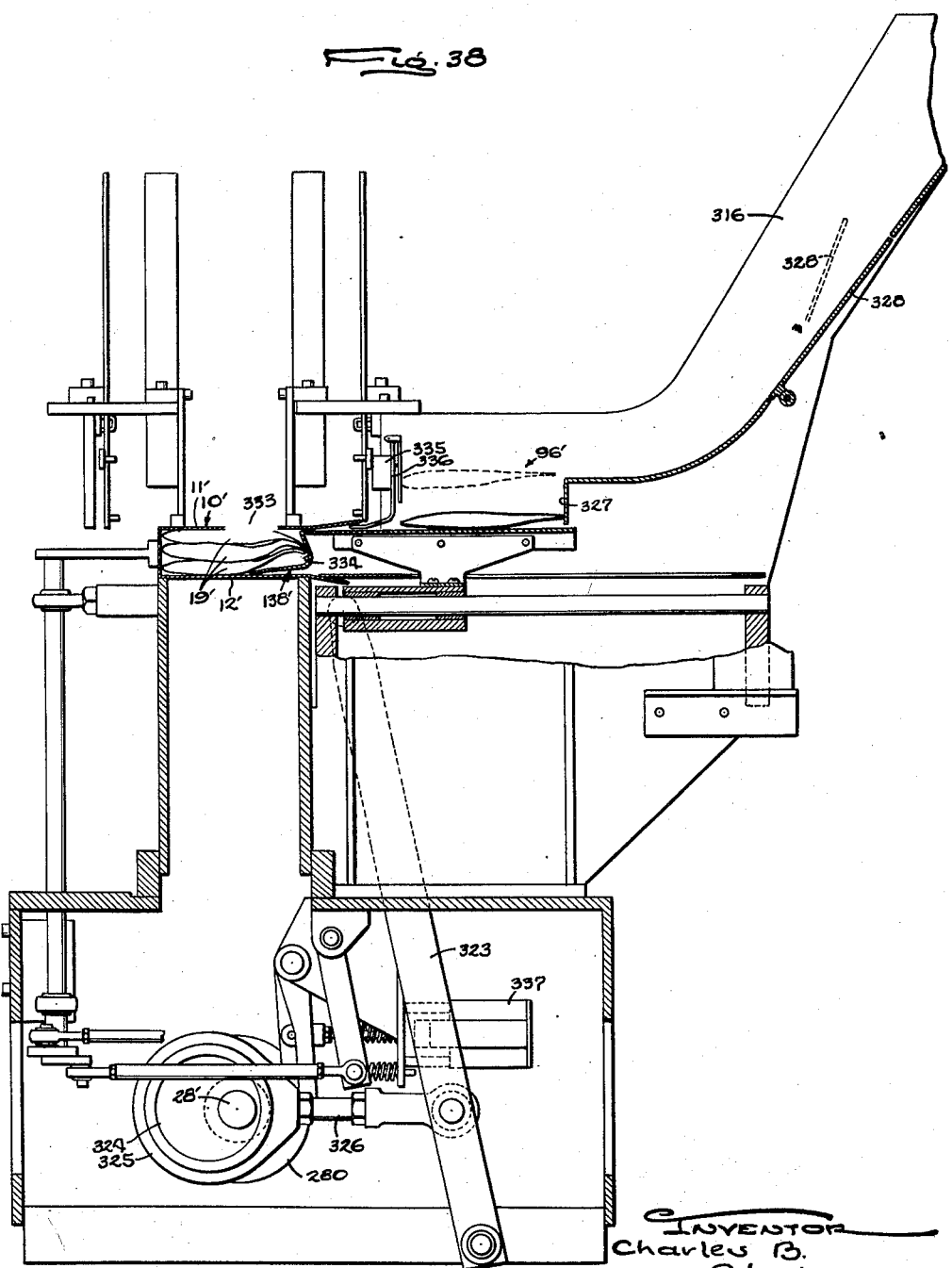

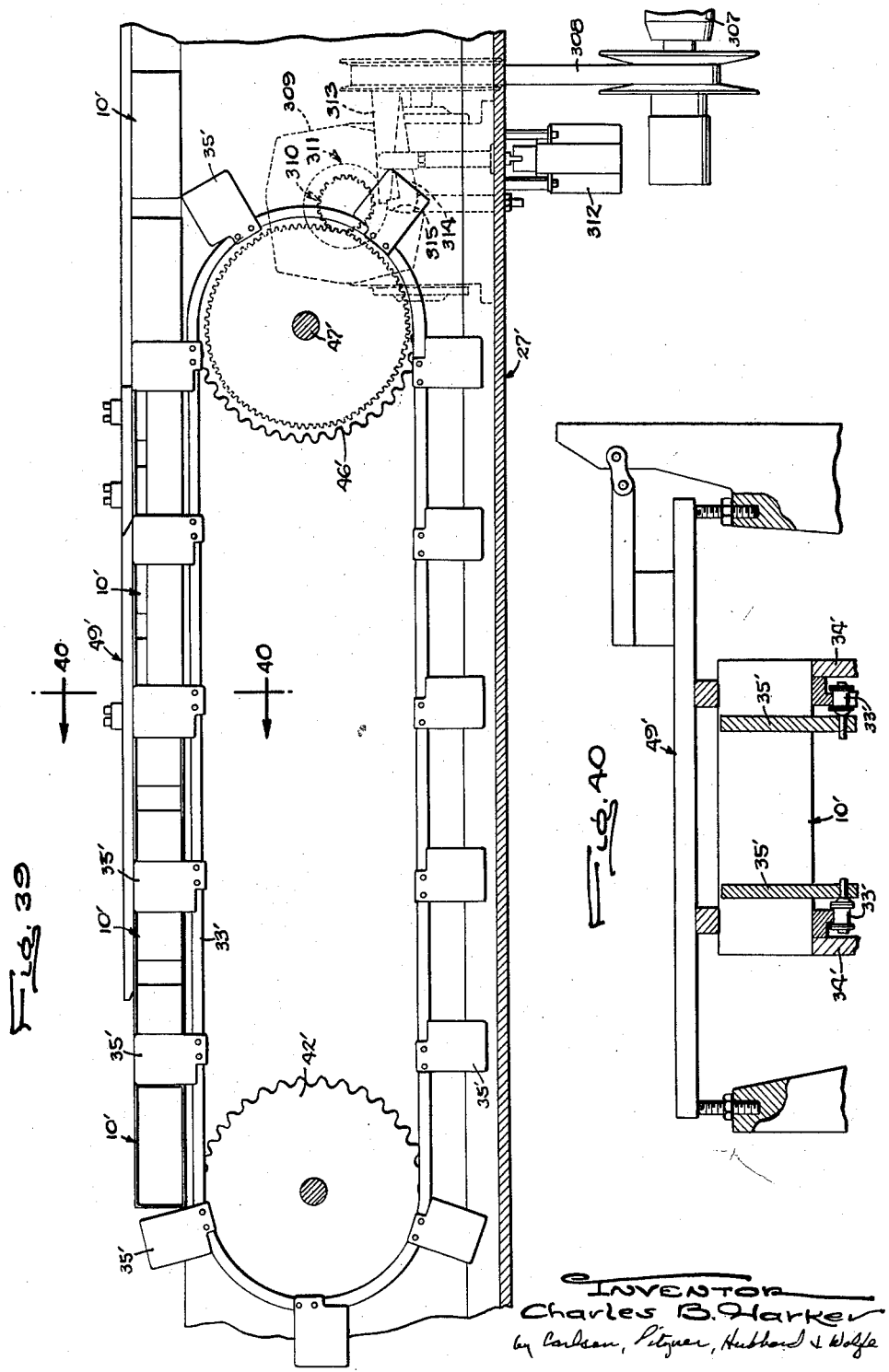

Feb. 2, 1960
C. B. HARKER
2,923,112
MACHINE FOR FILLING AND CLOSING CARTONS
Filed Dec. 1, 1954
27 Sheets-Sheet 27
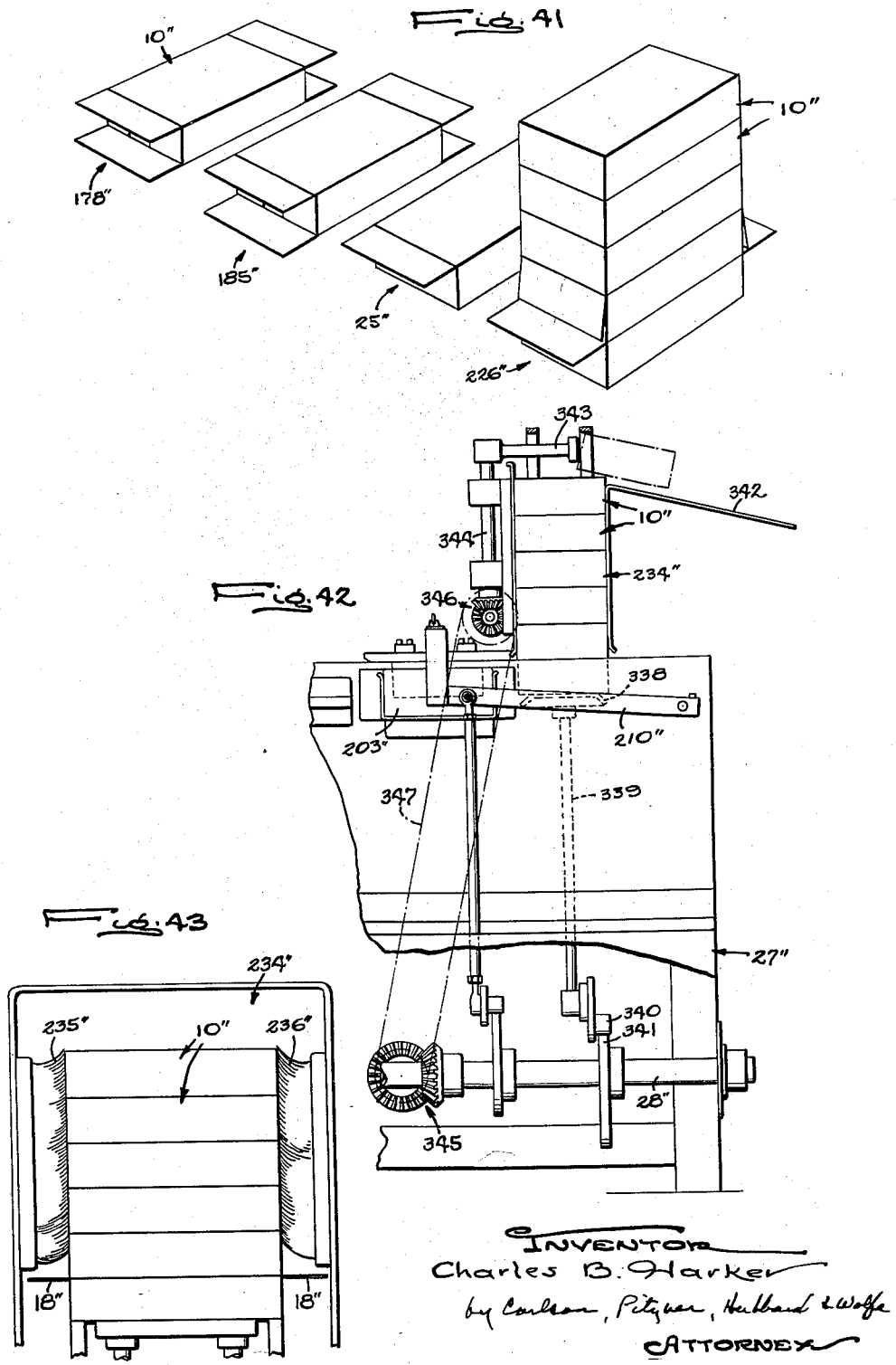

United States Patent Office 2,923,112
Patented Feb. 2, 1960

2,923,112

MACHINE FOR FILLING AND CLOSING CARTONS

Charles B. Harker, Rockford, Ill., assignor to Bartelt Engineering Company, Rockford, Ill., a corporation of Illinois Application December 1, 1954, Serial No. 472,326

19 Claims. (Cl. 53—58)

This invention relates to a machine for filling and closing cartons such as those having four walls and closed at each end by four flaps, one projecting outwardly from the end of each wall. More particularly, the invention has reference to machines in which the various filling and closing operations are performed at stations disposed successively along a predetermined path.

The general object is to provide a new and improved machine of the above character which is comparatively simple and compact in construction, which is positive in operation and which is rugged in service use.

Another object is to provide a machine in which the cartons are filled and closed in a novel manner so as to reduce the number of stations and operations required.

A more detained object is to provide mechanisms for filling and closing the cartons which mechanisms operate with simple reciprocating motions so that the various mechanisms may be actuated easily from a common operator such as a camshaft.

Another object is to provide a machine for filling the cartons with packages and to arrange the machine in a novel manner to operate in timed relation to the delivery of packages to the machine thus adapting the machine for use in conjunction with an automatic packaging machine.

It is also an object to utilize the delivery of the packages for stopping the machine automatically when the supply of cartons is exhausted or when the cartons are improperly positioned along the path.

The invention also resides in the novel structural character and arrangement of the various operating mechanisms used in transferring, filling and closing the cartons.

Other objects and advantages of the invention will become apparent from the following detailed description taken in connection with the accompanying drawings, in which Figure 1 is a fragmentary side elevation of a machine embodying the novel features of the present invention.

Fig. 2 is a fragmentary plan view of the machine.

Fig. 3 is a schematic perspective view illustrating the steps performed by the machine.

Fig. 4 is a fragmentary sectional view taken along the line 4—4 in Fig. 2.

Fig. 5 is a schematic perspective view illustrating the operating elements of the machine.

Fig. 6 is a fragmentary perspective view showing the actuators for the operating elements.

Fig. 7 is a sectional view taken along the line 7—7 in Fig. 4.

Fig. 8 is a fragmentary perspective view of the elements for opening a carton.

Fig. 9 is a view similar to Fig. 8 but showing the carton in a moved position.

Fig. 10 is a fragmentary sectional view taken along the line 10—10 in Fig. 12.

Fig. 11 is a perspective view of a carton before being opened.

Fig. 12 is a fragmentary sectional view taken along the line 12—12 in Fig. 1.

Fig. 13 is a perspective view of a carton opened preparatory to filling.

Fig. 14 is an enlarged fragmentary sectional view taken along the line 14—14 in Fig. 12.

Fig. 15 is an enlarged fragmentary sectional view taken along the line 15—15 in Fig. 1.

Fig. 16 is an enlarged sectional view taken along the line 16—16 in Fig. 2.

Fig. 17 is an enlarged fragmentary plan view of the mechanism for inserting the packages in the cartons, parts being broken away and shown in section.

Fig. 18 is a fragmentary sectional view taken along the line 18—18 in Fig. 17.

Fig. 18a is a fragmentary perspective view of the member supporting the carton for filling.

Fig. 19 is an enlarged fragmentary side elevation of the mechanism for loading the packages in the carton.

Fig. 20 is a fragmentary sectional view taken along the line 20—20 in Fig. 17 but showing the parts in a moved position.

Fig. 21 is an enlarged fragmentary plan view of a cartoning machine.

Fig. 22 is a sectional view taken along the line 22—22 in Fig. 21.

Fig. 23 is a fragmentary view similar to Fig. 22 and showing the parts in a moved position.

Fig. 24 is a view similar to Fig. 22 but shows the parts in a third position.

Fig. 25 is a fragmentary side elevation of the mechanism for applying the adhesive which holds the carton flaps closed.

Fig. 26 is a fragmentary plan view of the parts shown in Fig. 25.

Fig. 27 is a perspective view of the carton with all of the flaps folded in.

Fig. 28 is an enlarged sectional view taken along the line 28—28 in Fig. 21.

Fig. 29 is a side elevation of the actuating elements for folding in the last flap.

Fig. 30 is a view similar to Fig. 28 but shows the parts in a moved position.

Fig. 31 is a sectional view taken along the line 31—31 in Fig. 21.

Fig. 32 is an enlarged fragmentary perspective view of parts shown in Fig. 31.

Fig. 33 is an enlarged end view of the machine.

Fig. 34 is an enlarged fragmentary perspective view of the mechanism for transferring the closed carton.

Fig. 35 is a fragmentary side elevation of a modified form of the invention.

Fig. 36 is a fragmentary perspective view illustrating the operating elements and the actuators used in Fig. 35.

Fig. 37 is a fragmentary sectional view taken along the line 37—37 in Fig. 35, parts being broken away and shown in section.

Fig. 38 is an enlarged fragmentary sectional view taken along the line 38—38 in Fig. 35.

Fig. 39 is a sectional view taken along the line 39—39 in Fig. 37.

Fig. 40 is a sectional view taken along the line 40—40 in Fig. 39.

Fig. 41 is a perspective view illustrating the steps performed in a second modified form of the invention.

Fig. 42 is a fragmentary side elevation of a machine for performing the steps shown in Fig. 41.

Fig. 43 is an enlarged sectional view taken along the line 43—43 in Fig. 42.

As shown in the drawings for purposes of illustration, the invention is embodied in a machine for filling and closing a series of cartons or boxes 10 (Figs. 3 and 13) each of which comprises two side walls 11 and 12 and two edge walls 13 and 14 and is closed at each end by folding in four flaps 15 to 18 projecting outwardly from the respective ends of the carton walls. Herein, the upper side flaps 18 are the last to be folded in and are longer than the lower side flaps 17 so as to lie across the entire end of the carton when bent in. Preferably, the cartons 10 are filled with one or more packages 19 and, in the illustrated embodiment, three packages made of a flexible sheet material are inserted in each carton.

Generally stated, the improved cartoning machine of the present invention comprises a mechanism 20 (Fig. 4) for transferring the cartons 10 one by one from a magazine 21 to the receiving station 22 of a carrier 23 which supports the cartons on their sides in spaced relation and advances them edgewise step by step through successive stations disposed along the path of the carrier. At a station 24 beyond the receiving station 22, the packages 19 are inserted in the cartons and, as the carton advances through successive stations, the two edge flaps 15 and 16 at each end are folded in and then the lower side flaps 17 are bent up to lie against the edge flaps. With three flaps at each end folded, the carton is delivered to a station 25 at which an adhesive, such as glue, is applied to the underside of the upper edge flaps 18 and then the latter, at the next station 26, are folded in completing the closing of the carton ends. During the remaining advance of the cartons through the machine, the flaps are held in the closed position giving the adhesive time to set so that, when removed from the machine, the cartons are closed securely.

Preferably, the various mechanisms for transferring, advancing, filling and closing the cartons 10 are mounted on an elongated horizontal frame 27 (Figs. 1 and 4) and are operated in timed relation to each other from a single horizontal camshaft 28 journaled on the frame and generally paralleling the path of the cartons. The camshaft 28 is driven from a continuously rotating shaft 29 through a chain 30, a shaft 31 journaled on the frame 27 and a chain 32.

In the present instance, the carrier or conveyor 23 is in the form of an endless chain 33 (Figs. 3, 4 and 6) disposed in a vertical plane with the upper horizontal run defining the path of the cartons. Along opposite sides of the chain are two elongated parallel bars 34 (Fig. 12) fastened to the frame 27 and projecting above the upper run of the chain so that their upper edges constitute a support or guideway upon which the end portions of the cartons rest while being advanced from station to station, the bars being spaced apart a distance slightly less than the length of the carton body for this purpose. Rigid with the chain are a plurality of lugs or fingers 35 (Fig. 10) which project outwardly from and are spaced evenly around the chain, the distance between adjacent lugs being substantially equal to the width of the cartons to receive a carton between them. Herein, each lug comprises a block 36 bolted to one link of the chain 33 and having outwardly projecting flanges 37 and 38 at the leading and trailing edges thereof. Thus, each carton is held between the trailing flange 37 of one lug and the leading flange 38 of the next lug and the lugs slide the cartons along the guide bars 34 through the machine while holding them evenly spaced to position each of the cartons properly at the various operating stations.

In the present instance, the lugs 35 are arranged in such a way that the spacing between them may be varied to accommodate cartons of different widths. For this purpose, one of the flanges on each lug, in this case the flange 37, is constructed for selected adjustment toward and away from the next lug. Such adjustment may be achieved by forming the flange 37 as one leg of an L-shaped member whose other leg 39 extends across the top of the block 36. The member is held on the block by screws 40 extending through a slot 41 (Fig. 17) in the leg 39 and threaded into the block. The slot 41 is elongated in the direction of movement of the chain so that, by loosening the screws, the member may be moved to an adjusted position.

As shown in Figs. 3, 4 and 6, the conveyor chain 33 is wound around two vertically spaced sprocket wheels 42 and 43 disposed at the forward end of the machine and keyed to shafts 44 and 45 which are journaled on the frame 27 and extend transversely of the carton path. At its other end, the chain extends around a sprocket wheel 46 which is driven with an intermittent motion by its supporting shaft 47 through a suitable Geneva mechanism 48. Each time the sprocket wheel 46 is turned by the Geneva mechanism, it is turned through an angle sufficient to advance each carton one step, that is, from one station to the next succeeding station.

To hold the cartons down on the guide bars or rails 34 and between the lugs 35, a yieldable framework cover 49 (Figs. 15 and 33) is disposed above the carrier 23 parallel to the upper run thereof and lightly engages the upper side walls 11 of the cartons. Herein, the cover comprises two elongated horizontal bars 50 paralleling the guide rails and spaced apart laterally a distance sufficient to engage the upper carton walls 11 near the ends of the cartons. Arms 51 project laterally from each bar and, at their outer ends, the arms are pivotally connected to the frame 27 as indicated at 52 so that the bars may be swung up out of the way. Handles 53 are secured to the bars to facilitate such swinging. The bars 50 terminate short of the station 22 and, in advance of this station, the cartons are held down by a block 54 (Fig. 5) secured to a rod 55 which projects transversely over the carton path and is fixed to the frame 27.

Preparatory to being transferred to the loading station 22, the cartons 10 are stored in the magazine 21 in a flattened or collapsed condition, that is, with the four walls and the associated flaps lying substantially in a common plane as shown in Figs. 10, 11 and 12. In the present instance, the magazine comprises an upright generally U-shaped hollow casting mounted on the frame 27 by means of vertical posts 56 and defining a rectangular space 58 open along one side to receive a stack of collapsed cartons. The latter rest on elongated wire fingers 59 which are secured to the side walls 60 of the magazine and which project a short distance in under the flaps of the bottom carton of the stack. With this arrangement, the cartons may be removed one at a time through the open bottom of the magazine, the flaps bending up slightly during removal to pass around the supporting fingers 59.

To transfer a carton from the magazine 21 to the receiving station 22 in timed relation to the other operations of the machine, the transfer mechanism 20 (Figs. 10 and 12) comprises gripping elements 61 which are carried by a movable member 62 operated from the camshaft 28 and which remove the bottom carton in the magazine and set it down on the guide rails 34 between two adjacent sets of lugs 35 on the conveyor 23. In order that the transfer of the carton may be effected by a simple reciprocating motion, the gripping elements and their supporting member 62 are disposed between the rails 34 so that the gripping elements move down through the receiving station 22 leaving the carton on the guide rails as they pass through this station. Preferably, the gripping elements move through the receiving station in a direction perpendicular to the guide rails to insure proper entry of the carton between the lugs 35 and full engagement of the carton with the guide rails and, in the present instance, the gripping elements follow a substantially rectilinear path from the magazine to the loading station. With this arrangement of the magazine and the gripping elements, the transfer of the carton takes place in a generally vertical direction and does not add to the over-all length of the machine.

Herein, the gripping elements 61 are in the form of upwardly opening suction cups engaging the lower side wall 12 of the carton and mounted in pairs on two upright bars 63 (Fig. 6) which are fast on a horizontal shaft 64. The latter is journaled in a yoke 65 on the forward end of an elongated lever arm constituting the movable member 62 and extending longitudinally of the machine midway between the guide rails 34. Adjacent its rear end (Fig. 6), the lever 62 is secured to a transverse shaft 66 journaled on the frame 27 of the machine and defining the fulcrum of the lever. The lever is swung up and down about its fulcrum by an upright link 67 which at its upper end is pivotally connected to the shaft 66 through a link 68. At its lower end, the link 67 is pivotally connected to one end of a horizontal lever 69 which is fulcrumed at its other end on the frame 27. Between its ends, the lever 69 supports a follower roller 70 which rides in an axially facing groove 71 formed in a cam 72 on the camshaft 28. The cups 61 are connected to a vacuum source (not shown) through hoses 73 (Fig. 10) and a valve 74 (Fig. 1) in the hoses actuated by a cam 75 on the shaft 28 applies the vacuum to the suction cups in timed relation to the swinging of the lever 62 so that the cups grip the lower side wall 12 when they engage the bottom carton in the magazine 21 and release the carton as the latter reaches the receiving station 22.

To obtain the rectilinear movement of the carton from the magazine 21 to the receiving station 22, the lever 62 is part of a parallelogram linkage 76 (Figs. 4 and 10) which is completed by a short link 77 journaled on and depending from one end of the yoke 65 and by a long link 78 paralleling the lever 62. The link 78 is pivotally connected at one end to the lower end of the link 77 and at its other end it is pivotally connected to the frame 27 below the shaft 66 (Fig. 4). Because of the parallelogram linkage, the bars 63 remain upright and follow a path which describes a flat arc and is substantially linear.

Means is provided to open the cartons automatically as they are transferred from the magazine 21 to the loading station 22. Herein, this means comprises cam elements 79 (Figs. 8, 9 and 10) projecting into the path of transfer to engage the leading edge wall 14 of the carton so that, upon continued downward movement of the carton, this wall is bent up with the result that the other edge wall 13 also is bent up giving the carton the rectangular shape shown in Fig. 13. While the cam elements 79 may be formed integrally with the lugs 35 on the conveyor chains 33, it is preferred to use separate cams disposed in spaced side by side relation and mounted on the lower ends of supporting bars 80 (Figs. 10 and 12) which are rigid with and depend from the rear of the magazine 21. As shown in the drawings, the cams 79 project forwardly from the bars 80 and have curved surfaces 81 which engage the edge wall 14 and progressively bend this wall up to the open position. The cartons are held against the cam surface by elongated vertical bars 82 disposed along the inside of the front wall of the magazine and facing the cams 79. Thus, the bars engage the carton wall 13 and prevent the cartons from sliding across the suction cups 61 as the carton is opened.

Preferably, the cams 79 are supported in a novel manner to prevent jamming of the machine in the event a carton fails to open. Thus, the cams are supported to yield upon improper opening of a carton. Herein, this is achieved by pivotally mounting the cams 79 on the plates 80 by means of a rod 83 extending horizontally through the cams and into vertical slots 84 in the plates, the cams being secured to the rod. Yieldable detents 85 (Figs. 12 and 14) engage the cams and normally hold them in the operative position shown in Fig. 10. The detents may, as illustrated, be pins slidable in and projecting laterally from bosses 86 which are threaded into the plates 80 adjacent the mid-portion of the cams.

Each pin 85 projects into a depression 87 in the side of the adjacent cam and is urged into the depression by a coiled compression spring 88 encircling the pin and acting between the boss 86 and an abutment 89 on the pin. The latter acts to hold the associated cam in place during normal opening of the cartons but, if a carton should fail to open, the cams tend to swing back. Such swinging is permitted by yielding of the spring 88 so that the cams turn to an out-of-the-way position, the pin 85 riding out of the depression 87, and this permitting the unopened carton to pass without jamming the transfer mechanism 20. If desired, swinging of the cams may be utilized to actuate a suitable switch (not shown) for stopping the machine. The defective carton then is removed, the cams returned to their original position and the machine restarted.

After being delivered to the receiving station 22, the carton 10 is advanced along the guide rails 34 and the first folding operation is the bending in of the edge flaps 15 and 16. Preparatory to bending in the edge flaps, however, it is desirable to bend the upper side flaps 18 up and the lower side flaps 17 down slightly so that these flaps do not interfere with the folding of the edge flaps. While actuated elements may separate the flaps, it is preferred to obtain the separation automatically as an incident to movement of the carton along the rails 34. Thus, in the first advance of the cartons, the side flaps 18 and 17 pass respectively above and below stationary horizontal guide rods 90 and 91 (Fig. 5) extending along each side of the path of the cartons and serving to hold these flaps away from the center of the carton. The guides converge adjacent the front of the machine to insure that they are straddled by the flaps and are held apart by spacers 92 secured to each rod. The lower rod is fastened to a bar 93 (Fig. 16) which is bolted to the frame 27. The ends of the flaps 17 engage the bars 93 which thus hold the cartons against endwise shifting during the advance from the station 22.

At the first operating station 24 beyond the receiving station 22, the edge flaps 15 and 16 at one end of the carton are folded in and the packages 19 are inserted through the other end. To this end, folding elements 94 and 95 (Figs. 2 and 5) disposed at the station 24 along one side of the path of the cartons engage and bend in the edge flaps at one end and then, after at least one of these flaps has been folded, a filling mechanism 96 (Fig. 1) disposed at this station along the opposite side of the carton path inserts the packages through the other end, the folded flap serving as a stop to limit the extent of the insertion. Herein, the folding element 94 is integral with one end of an elongated stationary plate or plow 97 extending longitudinally of the machine adjacent the end of the carton body and the forward end 94 of the plow is flared outwardly, terminating approximately at the middle of a box at the filling station 24 as shown in Fig. 17. Thus, as a carton is advanced from the idle station 98 after the receiving station to the filling station, the leading edge flap 15 engages the flared edge 94 of the plow 96 and is bent in progressively by the plow as the carton comes to rest at the filling station.

To fold in the trailing edge flap 16, the folding element 95 is on the end of a horizontal arm 99 (Figs. 2 and 15) fast on the upper end of an upright shaft 100, which is journaled in bearings 101 on the frame 27, and swings toward the carton bending the flap in and holding the latter in the folded position until the next advance of the carton at which time this flap passes behind and is held in by the plow 96. The arm 95 is swung during a dwell of the cartons through the action of a cam 102 on the camshaft 28 engaging a follower roller 103 on a lever 104 which is fulcrumed on the machine frame and connected to an arm 105 on the lower end of the shaft 100 by a link 106, the follower being held against the cam by a compression spring 107 acting between an abutment 108 on the frame and an abutment 109 on a rod 110 which is pivoted to the lever 104. Thus, when the carton comes to rest at the filling station, a rise on the cam engages the follower which, through the medium of the lever 104, the link 106 and the arm 105, turns the shaft 100 swinging the folding arm 99 and bending in the flap 16.

After the carton reaches the filling station 24 and the leading edge flap 15 has been folded in, the filling mechanism 96 is actuated to insert the packages 19 through the open end of the carton. The packages may, as illustrated, be delivered to the filling mechanism from a bag making and packaging machine 111a (Fig. 1) by a conveyor 111. The machine 111a may be of the type shown in Bartelt Patent No. 2,649,674 and comprises, in general, a plurality of mechanisms for forming, filling and closing bags to make the packages 19. These mechanisms all are mounted on an elongated horizontal frame 112 and the bags are advanced step by step along the frame past the operating mechanisms by a carrier 113 (Fig. 2). The operating mechanisms and the carrier are operated in timed relation with each other by a continuously rotating camshaft which herein is the continuously rotating shaft 29, the latter being journalled on the frame 112 of the packaging machine 111a.

In the present instance, the conveyor 111 for transferring the packages 19 to the loading mechanism 96 comprises an endless chain 115 (Figs. 1 and 2) disposed in a vertical plane and having a horizontal run extending from a point alongside the discharge station 116 of the bag making machine 111a to a point alongside the loading station 24 of the cartoning machine. To conserve space and obtain compactness, the conveyor 111 is disposed on the same side of both the bag making and the cartoning machines and the latter are longitudinally spaced and in general alinement so that the overall assembly presents a substantially straight line operation.

Supporting the conveyor 111 in overlapping relation with the bag and carton carriers 113 and 23 are two generally U-shaped brackets 117 and 118 (Figs. 1, 2 and 18) bolted to and projecting laterally from the sides of the bag maker and cartoner frames 112 and 27 respectively. Horizontal shafts 119 and 120 projecting outwardly from the frames are journaled in the brackets 117 and 118 and sprocket wheels 121 and 122 (Fig. 3) around which the conveyor chain 115 extends are fast on the respective shafts. Secured to the chain in spaced relation are a plurality of pockets or bag holders 123 which, as they are advanced along the upper run of the chain, are supported by and slide along an upwardly opening channel bar or rail 124 (Fig. 1). The latter spans the brackets 117 and 118 and is screwed thereto. The bags 19, which are supported vertically by the carrier 113, are removed from the end of the packaging machine 111a by a suitable transfer device 125 which turns the bag through a right angle and deposits the bag in the pocket 123 when adjacent the machine end.

Each pocket 123 is in the form of a U-shaped casting which opens upwardly when on the upper run of the chain 115. The pockets are somewhat wider than the bags are long to receive the bags transversely between the side walls of the pocket as viewed in Fig. 19. For purposes of loading the bags in the carton, as will be described later, the ends of the pockets are open. The bags are prevented from slipping out of the pockets through the open ends by horizontal plates 126 which extend alongside the upper run of the conveyor from one end to the other, the plates being cut away at the loading station 24 as indicated at 127 in Fig. 19. The plates 126 are stationary and are supported by the rail 124 through the medium of bolts 128 and spacers 129 (see Fig. 18).

To synchronize the operation of the packaging machine 111a and the cartoning machine, the conveyor 111 is operated in timed relation with the bag carrier 113 and the carton carrier 23, in turn, is operated in timed relation to the conveyor in such a way that the bags are arranged on the conveyor in groups of the desired number and each group is inserted in a carton. More particularly, the cycle of the carrier 113 is timed to be an increment of the cycle of the conveyor so that a predetermined number of bags are deposited in the holder 123 which is in the receiving position before the conveyor is indexed. The cycles of the conveyor and the carrier 23, however, are of equal duration so that a holder 123 arrives opposite the loading station 24 each time an empty carton is presented to this station.

In the present instance, the bag carrier 113 cycles three times for each cycle of the conveyor 111, that is, the conveyor dwells while three successive bags are removed from the carrier and deposited in a holder 123. During the subsequent advance of the carrier 113, the conveyor is indexed one step to bring an empty holder beneath the discharge station 116 of the packaging machine and to present a filled holder to the loading station 24. The carton carrier is advanced in unison with the conveyor so that a filled carton leaves the station 24 and an empty carton arrives at this station each time the conveyor presents a new group of bags to the loading mechanism 96.

Preferably, the timed advance of the carriers 113 and 23 and the conveyor 111 is achieved by driving the conveyor and the carton carrier from the same member which drives the bag carrier, that is, from the camshaft 29. Thus, as described earlier, the camshaft 29 drives the intermediate shaft 31 through the chain 30 and the shaft 31 drives the camshaft 28 through the medium of the chain 32. Both the conveyor 111 and the carton carrier 23 are driven from the camshaft 28. Thus, the chain 33 of the carton carrier is driven through a sprocket wheel 130 on the end of the shaft 29, a chain 131 and a wheel 132. The latter drives the Geneva mechanism 48 (Figs. 1 and 6) whose output shaft 47 supports and drives the sprocket wheel 46 and thereby imparts the intermittent advance to the carrier chain 33.

The Geneva mechanism 48 also is effective to impart the intermittent motion to the conveyor chain 115 and, to this end, the drive sprocket wheel 122 of the conveyor is driven from the same shaft 47 which supports the drive sprocket sheet 46 of the carton carrier. Thus, a sprocket wheel 133 is secured to the shaft 47 and a chain 134 extends around this wheel, under an idler wheel 135 journaled on the frame 27, around a wheel 136 fast on the shaft 120 supporting the drive sprocket wheel 122, under a second and similar idler wheel 137 and back to the wheel 133. With the foregoing arrangement, the bag carrier 113 is indexed, as described in the aforesaid patent, once for each revolution of the shaft 29 while the Geneva mechanism 48 indexes both the conveyor 111 and the carton carrier 23 once for every three revolutions of the same shaft, this being due to the speed reduction effected by chain transmissions 30 and 32 between the shafts 29, 31 and 28.

The bags 19 in the holder 123 opposite the loading station 24 are inserted into the carton 10 at this station by the loading mechanism 96. This mechanism is constructed in such a manner so as to transfer the bags if a carton is properly positioned at the station 24 but to be inactive if there is no carton there. This is achieved by employing a pusher 138 (Figs. 16 through 20) which engages and pushes the bags forward into the carton on one stroke and then is shifted away from the path it originally took for the return stroke. After being returned, the pusher again is moved back into alinement with the bags but this movement is conditioned upon the presence of a carton at the the station 24. In the absence of a carton, the pusher remains displaced from its normal path and, therefore, is ineffective on the next forward strokes to push the next group of bags.

Herein, the pusher 138 is a block having small fingers 139 on the forward side to project above and below the bags 19 in the holder 123. The block 138 depends from a slide 140 which is formed with a hole 141 (Fig.

20) receiving a horizontal rod 142 (see Fig. 17) which extends transversely of the chain 115 toward the loading station 23. At one side, the block is formed with a notch 143 engaging the flattened sides of a second and parallel rod 144. The rods 142 and 144 serve as guides for the slide 140 in the latter's movement forward toward the carton carrier 23 to push the bags into the waiting carton.

Supporting the two rods 142 and 144 are end bars 145 (Fig. 17) extending across and secured to the opposite ends of the rods to form with the latter a framework 146. This framework, in this instance, constitutes the means for shifting the pusher block 138 laterally away from its normal path for the return stroke of the slide 140. To this end, the forward ends of the plates 145 are secured to a shaft 147 which is spaced from and parallels the rods 142 and 144 and which is journaled in the bracket 118 and in a bracket 148 (Fig. 17) bolted to the top of the carton machine frame 27. With the framework 146 thus supported, it may be swung up about the axis of the shaft 147 to raise the guide rods 142 and 144 and hence the pusher 138 above the conveyor holders 123 as the slide 140 is returned to its starting position shown in full lines in Fig. 18. The framework swings between an upper inactive position (Fig. 20) and an active position (Fig. 19) as determined by an adjustable stop 149.

To prevent the framework 146 from being lowered to its operative position unless a carton is properly disposed at the loading station 24, a feeler 149 detects the presence or absence of such a carton and selectively permits the framework to be lowered or holds the framework in its raised inactive position. As shown in the drawings (see Figs. 17, 19 and 20), the feeler 149 may be a roller carried on one end of an arm 150 whose other end is secured to a horizontal shaft 151 which supports the arm for swinging about the axis of the shaft. The latter is journaled on the framework 146 by means of ball bearings 152 supported by the end bar 145 and a bracket 153 rigid with this bar. Fast on the other end of the shaft 151 is a latch member 154 which is formed with a shoulder 155 (Fig. 20) cooperating with a stationary abutment or ledge 156 on the bracket 148. The arm 150 and the latch 154 are fixed to the shaft 151 at the angle illustrated in Fig. 20 so that the two turn together with the shaft.

When the framework 146 is in its uppermost position shown in Fig. 20, a point on the latch 154 below the shoulder 155 rests on the side of the ledge 156 as illustrated in full lines and the roller 149 is spaced above the carton 10 at the station 24. As the framework starts to swing down and before the shoulder engages the ledge, the roller 149 engages the carton (see the broken lines in Fig. 20) and then the roller moves along the top of the carton (Fig. 19). This swings the arm 150 out swinging the latch out so that the shoulder passes clear of the ledge permitting the completion of the lowering of the framework. In the absence of a carton, however, the roller 149 moves straight down as does the latch 154. As a result, the shoulder engages and rests on the ledge holding the framework up. With the framework thus held, the slide 140 is disposed above the holder 123 and the pusher 138 passes over the bags in the holder on its next forward stroke. On this stroke, therefore, the pusher is inactive.

In order to advance the pusher 138 toward the carton 10 as the latter dwells at the station 24, the slide 140 is moved forward on the guides 142 and 144 by the camshaft 28. For this purpose, a link 157 pivotally connected at one end (Fig. 16) to the slide extends horizontally across the conveyor 111 and the carrier 23 and its opposite end is joined by means of a swivel connection 158 to the upper end of an upright lever 159. The latter is fulcrumed at its lower end to a stationary plate 160 on the frame 27 and a generally horizontal rod 161 is pivotally joined to the lever above the fulcrum. At the opposite end, the rod supports a collar 162 encircling an eccentric 163 on the camshaft 28. The eccentric 163, through the rod 161, rocks the lever 159 about its fulcrum and, since the lever is connected to the slide 140 by the link 157, the slide moves forward and back.

On the forward stroke of the slide 140, the pusher 138 engages the ends of the bags in the holder 123, the upper finger 139 projecting over the top bag and the lower finger extending in under the bottom bag. The pusher slides the bags out of the holder, across a stationary plate 163 (Fig. 18) secured to the frame 27 and extending between the holder and the carton, and into the carton. During this time, the flaps 17 and 18 of the carton are held open by the stationary guides 90 and 91. To prevent the bags from jamming as they are inserted in the carton, the latter is supported so that one wall will, if necessary, bow outwardly to facilitate entry of the bags. This is achieved by dishing out the guide rail 34 nearest the loading mechanism 96 as shown at 164 in Fig. 18a. Such dishing permits the lower side wall 12 of the carton to be bowed downwardly by the bags as shown in Fig. 18 rather than buckling and preventing insertion of the bags.

Upon the completion of the forward stroke of the slide 140, the framework 146 is tilted up preparatory to the return stroke. For this purpose, an arm 165 (Figs. 16 and 19) is fixed to and projects forwardly from the pivot shaft 147 and pivotally connected to the outer end of the arm is an upright link 166 pivoted at its lower end to a lever 167. The latter is fulcrumed intermediate its ends on a block 168 rigid with the frame 27 and carries at its other end a roller 169 riding on a cam 170 on the shaft 28. A rise on the cam rocks the lever counterclockwise as viewed in Fig. 16 and this pulls the end of the arm 165 down thus swinging the framework 146 up. With the framework in the raised position, the eccentric 163 acting through the rod 161, the lever 159 and the link 157 returns the slide 146 back to outer ends of the guide rods 142 and 144. A fall on the cam 170 then permits the framework to drop under its own weight to lower the slide to its original position providing the feeler 149 detects the presence of the next empty carton at the station 24. If there is no carton at this station, the latch 154 holds the framework in the raised position and the surface of the cam 170 drops out of contact with the follower roller 169 until the next cycle of the camshaft 28.

Preferably, the carton at the station 24 is disposed in such a way as to insure the proper entry of the packages 19 into the carton. To this end, the carton is disposed slightly beyond the position of direct alinement with the pusher 138 and the trailing edge flap 16 at the loading end of the carton is bent back as shown in Fig. 17. Such bending is achieved by a finger 171 disposed alongside the path of the pusher and projecting into the carton path to engage and bend back the flap 16 during the final advance of the carton to the station 24. With this arrangement, the flap 16 acts as an inclined guide for directing the packages into the carton. At the same time, there is no danger of the packages bending in the other edge flap 15 since this flap is disposed beyond the packages.

Means is provided to permit the cartoning machine to continue its cycle in the event that the pusher 138 is blocked from further movement due to jamming of the bags or carton. This means includes parts which yield relative to each other upon such jamming and, preferably, the yielding of the parts operates to stop the machine. Herein, the yieldable parts constitute the parts of pivotal connection 158 (Fig. 16) between lever 159 and the link 157. Thus, the link is pivoted to a block 172 which is fast on the end of a bolt 173. The bolt projects through and slides in the lever 159 and a compression spring 174 encircling the bolt acts between the lever and a washer 175 on the bolt. In this way, the bolt and the lever normally move together to slide the pusher 138 upon rocking of the lever but, should the pusher jam, the lever may continue to rock against the action of the spring while the link 157 remains stationary.

In order to stop the machine when the pusher 138 jams, relative movement of the bolt 173 and the lever 159 operates a switch 176. The latter is secured to the lever and is actuated upon movement of a plate 177 which is fastened to the block 172. Thus, when the lever moves relative to the block, the switch is actuated. Preferably, the switch operates to stop the entire apparatus, that is, the bag making and cartoning machines and the conveyor 111, and, to this end, the switch 176, through a suitable control circuit (not shown) deenergizes the motor driving the shaft 29. If desired, the switch may also energize a brake (not shown) which holds the camshaft 29 against turning.

At the next station 178 (Figs. 2 and 3) beyond the loading station 24, the edge flaps 15 and 16 at the filling end of the carton are folded in. Such folding is effected by means similar to that used to fold in the edge flaps at the other end, that is, the curved portion 179 of a stationary plow 179ᵃ engages and bends in the leading edge flap 15 and finger 180 on a swinging arm 181 fast on the upper end of an upright shaft 182 bends the trailing edge flap in and holds this flap in until it passes behind the plow 179.

Advantage is taken of the location of the swinging arms 99 and 181 at adjacent stations 24 and 178 to use a single cam to turn both of the arm supporting shafts 100 and 182. For this purpose, the two shafts are interconnected by a horizontal link 183 (Figs. 6 and 15) extending transversely of the machine and pivotally joined at one end to an arm 184 similar to the arm 105 and projecting laterally from the shaft 182. At its other end, the link 183 is pivotally joined to the lever 104 so that it moves in unison with the link 106. Since the folding arm 99 swings counterclockwise as viewed in Fig. 2 while the arm 181 swings clockwise, the actuating arm 105 projects forwardly from the shaft 100 and the arm 184 extends rearwardly from its shaft so that the two shafts turn in opposite directions. As thus connected, the cam 102, through the lever 104, the links 106 and 183 and the arms 105 and 184, turns both shafts 100 and 182 with the result that the folding arms 99 and 181, are swung in unison but in opposite directions by the same cam.

After the edge flaps 15 and 16 have been bent in at both ends, the lower side flaps 17 at each end are folded up in the subsequent advance of the cartons. Preferably, the lower side flaps are folded during a dwell of the cartons and both flaps are bent up at the station 185 (Figs. 1, 2 and 3) immediately beyond the station 178. In the present instance, such folding is effected by folding elements in the form of L-shaped fingers 186 (Fig. 22) disposed at the station 185 adjacent opposite ends of the carton.

As shown in Fig. 22, the fingers 186 are supported on arms 187 which are pivotally mounted at 188 on the frame 27 to swing about axes paralleling the carton path and disposed beneath the rails 34. The longer legs 189 of the fingers are clamped to the outer free ends of the arms 187 while the shorter legs 190 project up toward the adjacent end of the carton so that, when the fingers are swung up by the arms, the legs 190 engage and fold in the lower carton flaps 17. Such swinging preferably is obtained through the same cam 72 (Fig. 6) which moves the transfer mechanism 20. For this purpose, upright links 191 are swivelled at 192 to the intermediate portions of the arms 187 while the lower ends of the link are connected to the transfer mechanism actuating arm 62 through a swivel joint 193, brackets 194 and pins 195 which project laterally from the arm 62. Thus, when the latter moves up during the initial part of the dwell of the carton to engage a carton in the magazine 21, the fingers 186 swing up and close the flaps 17.

The use of the cam 72 to fold the lower flaps 17 is permitted through the provision of means for holding the flaps in until the next advance of the carton so that the folding operation may take place anytime during the dwell period of the carton since it is not necessary that the fingers 186 hold the flaps until the end of the dwell. Herein, this means comprises a detent 196 which is shifted to an inactive position as the flap is being folded and which then, when the flap is folded all the way in, snaps to a position behind the flap to hold the latter. The detent 196 may, as illustrated, be a horizontally disposed resilient plate anchored at its outer end to the frame 27 by means of studs 197 and projecting toward the carton with its inner free end terminating opposite and alongside the carton end. As the flaps 17 is folded up by the finger 186, it engages and lifts the plate 196 (see Fig. 23). This continues until the flap is completely folded in at which time it passes beyond the end of the plate permitting the latter to spring back to its active or holding position (Fig. 24).

When the flaps 17 are folded up, they are on the outside of the plows 97 and 179ᵃ (Fig. 23). The latter terminates at the station 25 (Figs. 1, 2 and 3) so that, on the next advance of the carton, the flaps pass out of engagement with the plows. Before the carton completely leaves the station 185 and while the plates 97 and 179ᵃ still are holding the flaps, the carton enters the next station 25 where the flaps are held up by bars 198 (Figs. 21 and 26). The latter are disposed on opposite sides of the carton path in alinement with the plows and are U-shaped with the inturned legs 199 welded to brackets 200. The brackets are secured to the frame 27 by bolts 201 projecting through slots 202 in the brackets and threaded into the frame, the slots permitting adjustment of the brackets 200 to aline the bars 198 with the plows 97 and 179ᵃ.

During dwelling of the cartons at the station 25, an adhesive such as glue is applied to the under sides of the upper side flaps 18. For this purpose, receptacles 203 for the glue are disposed along the outer sides of the guide bars 198 and applicators 204 actuated from the camshaft 28 transfer glue from the receptacles to the upper flaps by reciprocating vertically between a lower position in the receptacles and an upper position against the upper flaps as illustrated in Fig. 25. The receptacles 203 are loosely received in frameworks 205 (Fig. 25) attached to and depending from the brackets 200. Each applicator 204 comprises a plurality of spaced fingers 206 formed by notching the upper edge of a bar with the tops of the fingers disposed in a horizontal plane so as to be moved up flat against the central portion of the underside of the upper flap 18. Supporting each set of fingers for movement between the lower and upper positions is a vertical wire 207 which is bolted at its lower end to a block 208 on the side of the bar 204. The upper end of the wire extends up out of the receptacle where it is bolted to a bracket 209 which projects down alongside the receptacle where it is bolted to the free end of an arm 210 fast on and extending forwardly from a transverse rockshaft 211 (Fig. 26). Each of the arms 210 is swung up and then down during dwelling of the cartons by the action of the cam 72 (Fig. 6), this being achieved by securing a lever 212 to the shaft 66 and connecting the free end of the lever to a link 213 whose other end is pivotally connected to one of the arms 210. Horizontal plates 214 (Fig. 25) disposed at the gluing station above the upper flaps and constituting backing members for the applicators 204 are secured to the bars of the cover. The wires 207 are made to yield slightly when the fingers 206 press the flaps 18 against the backing plates 214. Preferably, the applicators 140 in their lower or inactive position are submerged in the glue to prevent the glue from hardening on the fingers 141 and the spring 143.

At the next station 215 (Figs. 1, 2 and 3) beyond the station 25, the upper flaps 18 are folded down over the flaps 17 completing the closing of the carton. This folding is effected by a second pair of fingers 216 (Figs. 27 through 30) which are supported on the inner upper end of levers 217. The latter are fulcrumed intermediate their ends as indicated at 218 on a block 219 bolted to the frame 27. Initially, the levers 217 extend upwardly and inwardly from their fulcrums to support the fingers 216 above the flaps 18 and they are swung down to lower the fingers against the flaps and bend the flaps in. As in the case of the fingers 186, the fingers 216 are moved by the cam 72 (Fig. 6). This is achieved by journaling a shaft 220 (Figs. 6 and 29) on the frame 27 transversely of the carton path with arms 221 rigid with and projecting laterally from the ends of the shaft. An upright link 222 is swivelled at its lower end to the outer end of each arm 221 and at its upper end to the outer end of the adjacent lever 217. A similar arm 223 and link 224 together with an arm 225 fast on the shaft 66 connect the latter with the shaft 220. Thus, as the cam 72 turns the shaft 66 back and forth, the shaft 220 similarly is turned and, through the arm 221, the link 222 and the lever 217, the fingers 216 swing down against the flaps 18 and then back up.

Means is provided to hold the flaps 18 down until the carton is advanced to the next station 226. Preferably, this means also acts to hold the lower flaps 17 in prior to and during the folding of the upper flaps and herein it comprises resilient plates 227 similar to the plates 196. Each plate 227 is clamped to the top of one of the blocks 219 and projects downwardly from the block and then inwardly toward the carton 10 to engage the lower flap and hold the latter up as the carton enters the station 215. As in the case of folding the flaps 17, the fingers 216 swing down folding the flaps 18 down. During such folding, the flaps engage the plates 227 which yield and bend down out of the way to the position shown in Fig. 30. When the fingers 216 are raised to their starting position, the plates snap up behind the carton ends and hold the flaps 18 in place.

If desired, auxiliary arms 228 (Figs. 28 and 30) may be employed to aid the plates 227 in holding the flaps 17 up. The arms 228 are disposed above the plates 227 and project inwardly to engage the upper edge portions of the flaps 17. Herein, there is a pair of arms at each end of the carton, the arms of each pair being disposed on opposite sides of the adjacent plate 227.

In order that the arms 228 do not interfere with the operation of the folding fingers 216, the arms swing down out of the way as the fingers swing down. For this purpose, each pair of arms is fast on a horizontal shaft 229 which is journaled on the block 219. Also rigid with the shaft 229 and projecting upwardly therefrom at right angles to the arms 228 is a follower 230 having an inclined surface 231 which engages a roller 232 on the finger arm 217. A torsion spring 233 anchored at one end to an arm 228 and at the other end to the block 219 urges the surface 231 against the roller 232 and thereby causes the arms 228 to turn down when the fingers 216 are actuated. The arms 228 turn until they engage the frame 227 as shown in Fig. 30 after which the spring 233 yields. When the fingers 216 are returned to their upper position, the rollers 232 engage and lift the followers 230 raising the arms 228 back to the horizontal position.

After the glued flaps 18 have been folded down at the station 215, the carton is placed in an elongated guide 234 (Figs. 31 and 33) whose walls 235 and 236 oppose each other and resiliently press against the ends of the carton to hold the flaps in while the glue sets. Each carton is pushed through the guide by the succeeding cartons and finally it emerges at the opposite end of the guide, the length of the latter being correlated with the speed of the whole machine so that the time required for a carton to pass through is longer than the setting time of the glue. Herein, the wall 236 of the guide is a horizontal plate fastened to the frame 27 above the carton path and extending outwardly from the latter. The other wall 235 is formed by an endless belt which extends around a series of rollers 237 disposed in a horizontal row. The rollers are journaled on flat plates 238 extending along opposite sides of the rollers and supported above the bottom wall 236 by upright bars 239. Such journalling is achieved by projecting the axles 240 of the rollers 237 through vertical slots 241 in the plates 238. With this arrangement, the weight of the rollers bears yieldably on the cartons and is utilized to press the carton flaps in while the glue sets. One pair of the bars 239 may pivotally support the plates 238 as at 239a while the plates rest on the other pair of bars so that the upper wall 235 may be swung up to open the guide 235.

Means is provided to advance the cartons through the guide 234 in timed relation to the advance of the chain 33 so that the cartons are moved one step each time a carton is completed at the station 25. Herein, this means comprises two pusher arms 242 (Figs. 31, 32 and 33) disposed on opposite sides of the guide and formed with fingers 243 which project in behind the last carton in the guide. The arms first move forwardly pushing all of the cartons one step through the guide toward the exit end thereof and then they are moved back ready to receive the next completed carton.

The pusher arms 242 may, as illustrated in Figs. 31, 32 and 33, be riveted to upright bars 244, which straddle the plate 236 of the guide 234, and project rearwardly from these bars. At their rear ends, the arms 242 are formed with laterally projecting lugs which constitute the fingers 243. The arms are yieldable, being made of a resilient material such as spring steel, so that, when a carton is pushed into the guide, the arms spring apart permitting the carton to enter. When the carton is inside the guide, the arms 242 snap back disposing the fingers 243 behind the carton ready to engage and push the latter the next time the arms are shifted forwardly.

To support the arms 242 for shifting, the bars 244 are connected at their lower ends to a cross bar 245 (Fig. 31) which is disposed beneath the plate 236 and is pivotally connected to the upper ends of generally upright links 246 and 247. The latter are supported at their lower ends on a bracket 248 on the frame 27 by horizontally spaced pivots 249 and 250 and are parallel so that the links, the bracket and the crossbar form a parallelogram linkage. Thus, swinging the links 246 and 247 together about the pivots 249 and 250 causes the cross bar 245 and hence the pusher arms 242 to move back and forth along a flat arc. The arms are guided in such movement and are held against lateral shifting by lugs 251 projecting upwardly from the cross bar and into an elongated slot 252 formed in a block 253 on the underside of the plate 236.

The links 246 and 247 are turned about their pivots 249 and 250 at the proper time by a cam 254 fast on the shaft 28. A lever 255 which is fulcrumed on the bracket 248 by the same pivot 250 that supports the link 247 and is fastened to the latter, carries a follower roller 256 that rides on the cam. The follower is held down on the cam by a compression spring 257 acting between a fixed abutment 258 on the frame 27 and an abutment 259 on a rod 260 which slides in the fixed abutment and is pivoted to the lever intermediate the ends thereof. The cam 254 causes the lever 255 to tilt up and down and this turns the links 246 and 247 with the result that the pusher arms 242 are moved back and forth.

To transport the cartons 10 from the carrier 23 to the guide 234, the completed carton resting on the guide rails 34 is inserted into a carriage 261 (Figs. 31 and 34) which picks the carton up, turns it through a right angle and inserts it in the guide between the pusher arms 242. Preferably, the carriage is disposed at the next station 226 beyond the last folding station 215 in which case the guide 234 is disposed alongside the station 215. The carriage 261 is formed by two bars 262 of inverted T- shaped cross section with the inner flange 263 of each bar received in a recess 264 in one guide rail 34 so that the flanges 263 constitute continuations of the rails. Thus, the carton entering the station 226 is transferred from the rails to the flanges 263 and rests on these flanges between the legs 265 of the bars 262.

The bars 262 are supported to swing up through a right angle to insert the carton between the arms 242 in the guide 234. For this purpose, the forward ends of the bars are connected by a lever 266 which is cut out as indicated at 267 to permit the cartons to enter the station 226 and which is fulcrumed on the frame 27 at a point 268 short of its outer end and beneath the entrance of the guide 234. An upright link 269 is pivotally connected at its upper end to the outer end of the lever 266 and at its lower end to one end of a second lever 270. The latter is fulcrumed on the frame 27 at 271 adjacent its opposite end and, intermediate its ends, the lever carries a follower roller 272. The follower engages the periphery of a cam 273 on the shaft 28 and is held against the cam by a compression spring 274 which encircles a rod 275 pivoted at one end to the lever 270. The spring acts between an abutment 276 on the rod and a stationary abutment 277 on the frame 27 and thus urges the lever 270 upwardly toward the cam 273. When a rise on the cam swings the lever 270 down, the link 269 pulls the outer end of the lever 266 down swinging the carriage 261 up from the position shown in Fig. 31 to that shown in Fig. 33. This transfers the carton from the station 226 to the guide 234.

Following the advance of a single carton through the machine, it will be seen that a collapsed carton in the magazine 21 first is gripped by the suction cups 61 on the transfer arm 62 which draws the carton down toward the station 22 on the conveyor 23. During this downward movement, the leading edge wall 12 engages the cams 79 so that, as the carton is lowered between the conveyor chain lugs 35 at this station, it is opened. On the next advance of chain 33, the upper and lower flaps 18 and 17 pass respectively above and below the guides 90 and 91 as the carton moves to the next station 98 thus preparing the carton for the folding of the edge flaps 15 and 16.

As the carton approaches the filling station 24, the leading edge flap 15 at one end engages the plow 97 and is bent into the folded position. When the carton reaches the filling station, the cam 102 swings the arm 99 to bend in the trailing edge flap 16 and, at the same time, the pusher 138 operated by the eccentric 163 pushes three packages 19 into the carton through the opposite end. The arm 99 holds the flap 16 in until the pusher has moved back out of the carton and the conveyor 23 has begun to advance the carton the next step at which time the flap passes behind and is held in by the plow 97. During this advance of the carton to the third station 178, the leading edge flap at the filling end of the carton is engaged and bent in by the plow 179ª. The trailing edge flap 16 at this end is folded in by the arm 181 at the station 178 and is held in until the next advance of the carton in a manner similar to that in which the trailing flap at the other end was bent in.

With all four edge flaps folded in, the carton is advanced to the next station 185 where, during dwelling of the conveyor 23, the folding fingers 186 swing up and bend in the lower side flaps 17. After this and while the carton is still dwelling, the spring plates 196 snap down and hold the flaps 17 up until the latter pass behind and are held in by the guide bars 198 during the succeeding advance. At the next station 25, the cam 72 raises the applicators 204 out of the glue receptacles 203 and up against the under sides of the upper flaps 18 so as to apply the glue to these flaps. As the applicators are lowered back down into their respective receptacles, the carton advances another step to the station 215 where the fingers 216 swing down during a dwell period to fold in the upper flaps 18. As at the station 185, the spring plates 227 hold the flaps down during the next advance of the conveyor 23 until the carton enters between the bars 262 of the carriage 261. The latter, during the next dwell period, swings the carton up and into the guide 234 whose walls 235 and 236 press against the ends of the carton to hold the flaps in while the glue sets. Although the carton now is no longer engaged by the conveyor lugs 35, it is pushed along through the guide by succeeding cartons entering between the walls 235 and 236 and, when the carton reaches the exit of the guide, it is removed from the machine.

Instead of driving the elements of the cartoning machine directly from the packaging machine, the cartoning machine may be driven independently but be actuated in response to the delivery of bags from the packaging machine. Such an arrangement is shown in Figs. 35 through 40 wherein the same but primed reference numerals are used as were used in Figs. 1 through 34. In this case, the camshaft 28 is driven by a motor 278 through a suitable chain drive 279 and, for a purpose to be described later, is turned intermittently by the action of a one-revolution clutch 280. The cartons are advanced along the rails 34' by two chains 33' (Figs. 39 and 40) spaced laterally apart on the inside of the rails and each extending around sprocket wheels 42' and 46' at opposite ends of the machine. The chains carry spaced lugs 35' with the lugs on each chain alined with those on the other so that the lugs act in pairs to advance the cartons.

As in the preferred embodiment, the cartons are removed from a magazine 21' through the open bottom thereof, opened by stationary cams 79' as it is lowered onto the rails 34', and set down on the rails between two sets of lugs 35'. Similarly, the carton is advanced edgewise to a station 24' where the edge flaps 15' and 16' at one end are closed while packages 19' are inserted at the other end, and then, at successive stations 178', 185', 25' and 215', the edge flaps at the filling end are closed, the lower flaps 17' at both ends are folded up, glue is applied to the undersides of the upper flaps 18' and the latter are folded down.

The mechanism 20' for transferring the cartons from the magazine 21' to the rails 34' is similar to the mechanism 20 and moves the cartons in a substantially straight line. In this case, however, the arm 63' supporting the suction cups 61' is pivoted at 281 on the free end of the lever 62' and is guided in the linear movement by an upright arm 282 engaging the edge of the carton, that is, the pivot 281 permits the straight line movement caused by the guide 282.

For folding in the edge flaps 15' and 16', substantially the same elements are used as in Figs. 1 through 34, namely, the plows 94' and 179' and the fingers 99' and 181' operated from the single cam 102'. The fingers 186' and 216', however, are somewhat different in construction and are actuated by a separate cam 292. Thus, as shown in Figs. 35 and 36, the fingers 186' are mounted on forwardly projecting arms 284 of bell crank levers 285 while the fingers 216' are secured to rearwardly projecting arms 286 of a second set of bell crank levers 287, all of the levers being fulcrumed on the frame 27'. The downwardly projecting leg 288 of each lever 285 is connected by a link 289 to the corresponding leg 290 of the adjacent lever 287 and the two levers 287 are connected by the fulcrum shaft 291. Thus, all of the bell crank levers turn together, the levers 285 swinging up while the levers 287 turn down. Such swinging is obtained through a cam 292 fast on the shaft 28' and acting on one of the levers 287 through a follower 293, a lever 294, a link 295 and an arm 296. The cam 292 retains the levers 285 and hence the fingers 186' in the folding position until the initial advance of the carrier 23' when the flaps 17' pass behind horizontal bars 297 (Fig. 36) which form continuations of the plows 94' and 179'.

Similarly, the fingers 216' hold the flaps 18' until the carton enters between plates 235' and 236' which are continuations of the bars 297.

A separate cam 300 also is used to operate the glue applicators 204' which herein are formed by a plurality of elongated wire fingers 206' supported by one leg of an inverted U-shaped bracket 301 straddling a wall of the glue receptacle 203'. The other leg of the bracket is, by means of an upright link 302, supported on the free end of a horizontal lever 303 which carries a follower 304 intermediate its ends. The follower rides on the cam 300 which is keyed to the shaft 28' and operates during each dwell of the carrier 23' to raise and then lower the glue fingers 206'.

Beyond the station 215' where the glued upper flap 18' is folded down, the carton leaves the carrier 23' and is squeezed between the plates 235' and 236' which, in effect, form a guide 234'. The cartons between the plates are pushed along the rails 34' by the succeeding cartons and the time required to pass out from between the plates is sufficient to allow the glue to set. To permit the cartons to slide along the guide rails 34', the plates are moved relatively apart during each advance of the chain 33'. For this purpose, the plate 236' is bolted on the frame 27' and the plate 235' is supported, by any suitable means, for sliding laterally toward and away from the plate 236'. Sliding of the plate 235' in timed relation with the advance of the cartons is effected by a fluid motor 305 which is mounted on the frame with its piston connected to the plate. Operating fluid such as compressed air controlled by a cam actuated valve 306 (Fig. 35) is admitted to the motor during dwelling of the cartons to slide the plate 235' toward the plate 236' and squeeze the cartons and is vented during each advance to release the cartons.

As shown in Fig. 39, each conveyor chain 33' is driven by a motor 307 mounted on the frame 27', the motor driving the sprocket wheel 46' through a belt 308, a suitable speed reducer 309 and a gear train 310 whose terminal gear is keyed to the shaft 47'. Between the speed reducer and the gear train is a one-revolution clutch 311 actuated by a solenoid 312 which is energized by a switch (not shown). The latter is operated by a cam 313 on the shaft 28' and the solenoid, when energized by the switch, swings a pivoted arm 313 down to retract a dog 314 from a notch 315 in one of the clutch elements and initiate turning of the sprocket wheel 46'. During the single revolution of the clutch, the sprocket wheel is turned through a sufficient angle to advance each carton one step, that is, from one station to the next succeeding station. The cam 313 causes the clutch 311 to be energized after the transfer mechanism 20' has set a carton on the rails 34', after all the flaps have been folded in, after lowering the applicators 204' back into the receptacles 203' and while the fingers 186' and 216' hold in the flaps 17' and 18' of the adjacent cartons.

In this form of the invention, the mechanism 96' (Figs. 37 and 38) for loading the bags into the carton at the station 24' comprises a scoop or holder 138' facing the open carton end and disposed at the bottom of a chute 316 which may, if desired, receive directly the packages made on an automatic packaging machine 111ᵃ (Fig. 36). At the bottom of the chute is a flat horizontal plate 317 on which the packages dropping through the chute collect. The plate 317 is substantially level with the lower side wall 12' of the carton and forms a continuation of the guide bar 91' so that the lower side flap 17' passes under the plate where it does not interfere with the insertion of the packages. In its retracted position, the scoop 138' is behind the lower end of the chute as shown in Fig. 37 so that the packages collect on the plate in front of it and, in inserting the packages, the scoop moves forward along the plate and into the carton as illustrated in Fig. 38.

The scoop 138' is slidably mounted on the frame 27' and is operated from the camshaft 28' in timed relation with the advance of the cartons 10'. For this purpose, the scoop is carried on the front of a horizontal plate 318 which, by means of upright brackets 319 projecting through a longitudinal slot 320 in the plate 317, is mounted on a guide sleeve 321 sliding on a rod 322 extending transversely of the carton path. Pivotally connected at one end to the sleeve is a generally upright lever 323 fulcrumed at its lower end on the machine frame. An eccentric 324 on the camshaft 28' is journaled in a ring 325 fast on one end of a connecting rod 326 which at its other end is pivoted to the lever 323 intermediate the ends thereof. Thus, when the camshaft turns, the eccentric rocks the lever to slide the scoop first forward into the carton at the station 24' and then back to the retracted position. While the scoop is sliding into and out of the carton, the plate 318 is disposed beneath the chute 316 and serves as a table for collecting the packages 19' during the filling operation. As the table is moved back out from under the chute, the packages are engaged by a stop 327, herein the lower portion of the back wall of the chute, which holds the packages in the chute where they will drop in front of the scoop when the latter reaches its retracted position.

Provision is made for diverting the packages 19' from the chute 316 if a carton should fail to arrive at the filling station 24' or not be in the proper position to receive the packages so that an excess number of packages will not collect in front of the scoop 138'. Herein, this is achieved by placing a gate 328 in the chute and connecting the gate to a lever 329 (Fig. 37) which is urged in the gate closing direction by a contractile spring 330 and is moved to swing the gate to the open position, shown in broken lines in Fig. 38, by a solenoid 331 mounted on the frame 27. The solenoid is actuated by a feeler in the form of a microswitch 332 disposed at the filling station in position to be engaged by a part of the carton, herein the flap 17', and, during dwelling of the latter, the microswitch completes the circuit to the solenoid if not engaged by a carton properly positioned at this station.

In some instances, the carton may be provided with a window 333 in the front wall 11'. Since the walls of the packages 19' are flexible, the bulk of the material in them is disposed in the bottom of the package leaving the upper portion substantially empty as shown in Fig. 38. As a result, the packages are thinner near their upper ends and fall away from the window 333 when inserted in the cartons 10'. Thus, the latter appear to be only partially filled and such an appearance detracts from the consumer appeal.

To give the cartons a full and appealing appearance, the filling mechanism 96' bends the packages 19' up against the upper wall 11' to place the bodies of the packages close to the window 333. To this end, the scoop 138' is formed with a cam 334 (Fig. 38) which engages the upper ends of the packages and, upon relative endwise shifting of the packages and the scoop, bends these ends down. Such bending bows the packages upwardly toward the window wall of the carton as shown in Fig. 38. Preferably, the relative shifting of the packages and the scoop is obtained by pushing the bottoms of the packages against the partially closed end of the carton so that, in the final portion of the forward stroke of the scoop, the packages are held against further sliding while the scoop continues to advance a short distance forward.

In the present instance, the upper edge portion of the scoop 138' is curved upwardly and forwardly and projects over the upper ends of the packages 19' to form the cam 334. Thus, after the packages abut against the closed carton end, the ends of the packages engaged by the scoop are bent down by the curved cam in the final forward movement of the scoop. To assist the cam 334 in bowing the packages, the lower edge of the scoop extends in under the bottom package and is disposed somewhat above the lower side wall 12' of the carton as illustrated in Fig. 38 so as to support the packages between their ends and press up on the intermediate body portions of the packages. By making the latter of foil or similar material, they are given a comparatively permanent bow and remain bent up against the window wall 11' after the scoop is withdrawn from the carton.

Each revolution of the camshaft 28' and hence each cycle of the various operating mechanisms is initiated in response to the presence of a predetermined number of packages 19' in front of the scoop 138' so that the machine operates in timed relation with the delivery of the packages through the chute 316. In the present instance, the means responsive to the number of packages is a conventional counter (not shown) actuating a switch 335 (Fig. 38) and mounted on the inner wall 336 of the chute 316 where it is struck by each package falling through the chute. When a predetermined number of packages, in this case three, have struck the switch actuator, the counter momentarily energizes a solenoid 337 which causes engagement of the clutch 280. The latter thereby is engaged effecting a single revolution of the camshaft 28' and one cycle of the operating mechanisms.

A complete cycle of the various operations of the machine occurs while the requisite number of packages 19' are collecting in the chute 316. Preferably, the time of the cycle is slightly less than the time required to deliver one set of packages to the chute so that the machine will be conditioned for a second cycle when the counter 335 initiates operation of the camshaft 28'. Since the conveyor 23' is actuated to index the cartons 10' during the final turning of the camshaft and continues to run after the latter has stopped, each cycle includes one complete revolution of the camshaft plus the remainder of the time during which the conveyor runs.

By making the time of each operating cycle less than the normal time required for the packaging machine 114' to deliver three packages 19', advantage is taken of the action of the gate or deflector 328 to prevent the further operation of the cartoning machine should a carton fail to arrive or be properly positioned at the filling station 24'. Thus, the indexing of the conveyor 23' is completed before the delivery of the third package to the filling mechanism and, as a result, the feeler switch 332 detects the presence or absence of a carton at the filling station before the counter senses the presence of three bags in front of the scoop 138' and initiates a new cycle. Therefore, the absence of a carton correctly disposed at the filling station will be detected by the feeler in time to swing the gate 328 across the chute 316 and deflect the third package. Since the switch 335 will not have been struck a third time, the clutch 280 will not be engaged to start the next cycle and the machine will remain idle until the defective condition is remedied.

A third form of the invention, similar to the second, is illustrated in Figs. 41 through 43 and, in this case, the cartons are pushed up into a tubular guide 234" which folds the upper flaps in as the carton enters the guide and then holds the flaps in while the glue sets. The tubular guide is an open ended box of rectangular cross section disposed above the next station 226" beyond the gluing station 25' and a foot 338 disposed beneath the carton at the latter station is mounted on the upper end of a vertically reciprocating rod 339 and pushes the carton into the guide. The rod 339 carries at its lower end a follower roller 340 engaging a cam 341 on the camshaft 28" and the cam is shaped to raise the carton into the guide during dwelling of the conveyor 23".

Brushes 235" and 236" mounted on the inside of the tubular guide 234" adjacent the ends of the cartons engage the upper flaps 18" as the carton is raised and, as an incident to the entry of the carton into the guide, bend these flaps down. The brushes also yieldably press against the ends of the carton holding the flaps in until the adhesive sets. As a new carton is pushed up into the guide, the other cartons in the stack are moved up and, when a carton reaches the top of the stack, it is pushed off onto a slide 342 by a horizontal arm 343 fast on the upper end of an upright shaft 344 which is driven from the camshaft 28" by suitable gearing 345 and 346 and a belt drive 347.

It will be observed from the foregoing that the machine of the present invention is comparatively easy to construct yet is positive in operation and rugged in service use. Several of the operations, such as the opening of the cartons and the bending in of the leading edge flaps, are performed automatically as an incident to the movement of the cartons and each of the movable mechanisms for filling and closing the carton operate with simple reciprocating motions making it possible to actuate the parts easily from a common camshaft. Further, the machine is short and compact requiring relatively little space and, in one form of the invention, the machine is even shorter since the final portion of the path of the cartons extends in a vertical direction.

This application is a continuation-in-part of my copending application Serial No. 345,339, filed March 30, 1953, now abandoned.

I claim as my invention:

1. In a machine for filling and closing a box having two side and two edge flaps at each end, the combination of, mechanism for supporting a series of boxes in spaced relation and advancing the same edgewise step by step through a plurality of stations, means for delivering boxes successively to the first of said stations with the flaps at each end lying in the planes of the respective box walls, a member disposed along the path of advance of the box and operable in the advance of the box to the second station to fold in the leading edge flap at one end, an element disposed at said second station and operable to fold in the trailing edge flap at said one end, a loader operable to insert a package in the box while the latter is dwelling at said second station, a similar folding member and element at a third station one step beyond said first member and said first element and engageable with the corresponding edge flaps at the other end of the box to bend the same in, means disposed at a fourth station beyond said members and said elements and operable to fold up the lower side flap at each end, an applicator disposed at a fifth station and movable upwardly to apply an adhesive to the underside of each of the upper side flaps, and mechanism disposed beyond said fifth station for folding the upper side flaps down against the lower side flaps.

2. In a machine for filling a carton, the combination of, a carrier for supporting and advancing a series of cartons step by step along a predetermined path to present the cartons successively to a filling position, a loading mechanism disposed along said path and operable to insert packages into the carton at said position, means for delivering packages to said loading mechanism at normally equal intervals of time, a sensing element detecting the delivery of packages to said loading mechanism, a timing device operable intermittently in cycles, each cycle being of less duration than the normal time required to deliver a predetermined number of packages to said loading mechanism and initiated by said sensing element in response to the delivery of said predetermined number of packages, and connections between said timing device and said carrier and loading mechanism and operable during each cycle of the timing device to actuate said loading mechanism and operate said carrier thereby to fill the carton at said filling position and advance said series of cartons one step.

3. In a machine for filling cartons, the combination of, a carrier for supporting a series of cartons and advancing the same step by step to a filling position, a loading mechanism operable to insert packages into the carton at said position, a timing device operable in cycles and connected to said loading mechanism and said carrier to actuate first the loading mechanism and then the carrier during each cycle, means to deliver packages successively along a predetermined path to said loading mechanism, a sensing element responsive to the delivery of packages to said loading mechanism and operable upon the delivery of a predetermined number of packages to initiate a cycle of said timing device, each of said cycles being of less duration than the time required to deliver said predetermined number of packages to complete the advance of said carrier before the delivery of the final package of said number, a feeler detecting the presence or absence of a carton properly positioned at said filling position, and means actuated by said feeler in the absence of a carton at said position and operable when actuated to divert succeeding packages from said path thereby to prevent the delivery of said final package and the initiation of the next cycle of said timing device.

4. In a machine for filling cartons, the combination of, a carrier for supporting a series of cartons and advancing the same step by step to a filling position, a loading mechanism operable to insert packages into the carton at said position, a timing device operable in cycles and connected to said loading mechanism and said carrier to actuate first the loading mechanism and then the carrier during each cycle, means to deliver packages successively along a predetermined path to said loading mechanism, a sensing element responsive to the delivery of packages to said loading mechanism and operable upon the delivery of a predetermined number of packages to initiate a cycle of said timing device, a feeler detecting the presence or absence of a carton properly positioned at said filling position, and means actuated by said feeler in the absence of a carton at said position and operable when actuated to divert succeeding packages from said path.

5. In a machine for filling cartons, the combination of, mechanism for supporting a series of cartons and advancing the same to present the cartons successively to a filling position, a loader operable to insert packages in the carton at said filling position, a chute guiding the delivery of packages to said loader, a deflector normally disposed in an inactive position out of the path of the packages being delivered through said chute and movable to an active position across said path, a feeler disposed at said filling station and operable to detect the presence or absence of a carton properly positioned at said station, and means responsive to said feeler and operable in the absence of a carton properly positioned at said station to move said deflector to said active position thereby to prevent further delivery of packages to said loader.

6. In a machine for filling and closing cartons having flaps at each end, the combination of, a frame, a carton supporting guideway mounted on said frame and defining a predetermined path, a carrier operable intermittently and engaging the cartons on said guideway to move the same step by step along said path, mechanism for delivering cartons to said guideway, mechanism for filling the cartons, mechanism for applying adhesive to certain of the flaps, mechanism for folding said flaps in, said mechanisms being disposed along said path and movable back and forth between active and inactive positions, a plurality of reciprocating members mounted on said frame, a plurality of connections, one between each of said mechanisms and one of said members and operable to move the latter first to said active position and then to said inactive position, and a common operator connected to said carrier to move the same intermittently and connected to said members to reciprocate the members and move said mechanisms toward their active positions during dwelling of the carrier.

7. In a machine for filling and closing cartons having flaps at each end, the combination of, a frame, a carton supporting guideway mounted on said frame and defining a predetermined path, mechanism for delivering cartons to said guideway, mechanism for filling the cartons, mechanism for applying adhesive to certain of the carton flaps, mechanism for folding in said flaps, said mechanism being disposed along said path and movable back and forth between active and inactive positions, a plurality of reciprocating members mounted on said frame, a plurality of connections, one between each of said mechanisms and one of said members and operable to transmit reciprocation of the member to the associated mechanism to move the latter first to the active position and then to the inactive position, and a common operator connected to said members and operable to reciprocate the members in timed relation to each other.

8. In a machine for filling and closing cartons, the combinations of, a frame, a guideway defining a predetermined path, a carrier having spaced lugs engaging cartons on said guideway to move the cartons along said path through a plurality of stations, said lugs being spaced apart a distance corresponding to the width of a carton, a magazine disposed alongside but spaced laterally from said path and adapted to hold a supply of cartons to be filled, a member mounted on said frame for movement back and forth between first and second positions, a gripping element, and means mounting said gripping element on said member for bodily movement therewith to transfer a carton from said magazine to one of said stations when said member moves from said first position to said second position, said means including a connection between said gripping element and said member for moving said gripping element to said one station along a generally rectilinear path whereby the carton enters between said lugs.

9. In a machine for filling and closing four-sided cartons at successive stations, the combination of, a frame, a magazine for holding a plurality of collapsed cartons mounted on said frame and having an open end, a member supported for movement between said magazine and a first one of said stations and engageable with a carton in the magazine thereby to withdraw the carton from the magazine and transfer the same to said first station, elements projecting laterally into the path of transfer and engaging a part of the carton to open the latter during transfer of the carton to said station, and means resiliently supporting said elements on said frame to yield and move away from said path upon failure of a carton to open.

10. In a machine for filling and closing four-sided cartons at successive stations, the combination of, a frame, a magaine for holding a plurality of collapsed cartons mounted on said frame and having an open end, a member supported for movement between said magazine and a first one of said stations and engageable with a carton in the magazine thereby to withdraw the carton from the magazine and transfer the same to said first station, elements normally disposed in an active position in which they project laterally into the path of transfer and engage a part of the carton to open the latter during transfer of the carton to said station, means pivotally supporting said elements on said frame to swing between said active position and an inactive position alongside said path, and a spring biased member engaging said elements normally to hold the same in said active position but permitting the elements to yield and move out of said path upon failure of a carton to open.

11. In a machine for filling and closing the ends of a carton having four flaps at each end, the combination of, mechanism for supporting a carton and advancing the same along a predetermined path to a dwell station, a member engaging the trailing flap at one end of the carton as the latter enters said station and operable to bend the flap back, a receptacle disposed alongside said station opposite said one carton end but offset rearwardly from the carton by an amount less than the bending back of said trailing flap, said receptacle being adapted to receive packages to be inserted in the carton, and a transfer element movable transversely of said path and engageable with a package to slide the same toward said carton, said trailing flap engaging the package and camming the same into the carton.

12. In a machine for filling cartons with packages, the combination of, means for supporting a carton on its side in position to be filled, a chute for directing packages to a point alongside the carton, a loader normally disposed beneath said chute to receive the packages delivered to said point, an actuator connected to said loader and operable to move the loader toward and away from the carton to insert the packages received by the loader into the carton, a platform movable between a first position across the bottom of said chute and a second position alongside the chute and connected to said actuator to move in unison with said loader to said first position and then back to said second position as the loader moves respectively toward and away from said carton thereby to collect the packages delivered through said chute during movement of said loader, and a stop engaging the packages on said platform to retain the packages in said chute during movement of the platform to said second position to permit the packages to be received by said loader upon the completion of a filling operation.

13. In a machine for filling cartons with packages, the combination of, means for supporting a carton on its side in position to be filled, a chute for directing packages to a point alongside the carton, a loader normally disposed beneath said chute to receive the packages delivered to said point, an actuator connected to said loader and operable to move the loader toward and away from the carton to insert the packages received by the loader into the carton, and a platform movable between a first position across the bottom of said chute and a second position alongside the chute and connected to said actuator to move in unison with said loader to said first position and then back to said second position as the loader moves respectively toward and away from said carton thereby to collect the packages delivered through said chute during movement of said loader.

14. In a machine for inserting a flexible package in a carton having a window in one side wall thereof, the combination of, means for supporting a carton in a position for filling with one end of the carton open and the other end at least partially closed, a holder disposed adjacent said position and adapted to receive a package, mechanism for moving said holder into the carton through said open end thereby to push the package endwise into the carton and against the closed end thereof, and a cam on said holder engaging the trailing end of the package and operable in the final movement of the holder after the package abuts against the closed carton end to bend said trailing end laterally of and away from the carton window thereby to bow the package and dispose the body of the same against the window.

15. In a machine for inserting a flexible package in a carton having a window in one side wall thereof, the combination of, means for supporting a carton open at one end in a position for filling, a holder disposed adjacent said position and adapted to receive a package, mechanism for moving said holder into the carton through the open end thereof thereby to push the package endwise into the carton, said holder having a part engaging and supporting the package intermediate the ends thereof and on the side opposite the carton window, and a cam on said holder disposed at an angle with respect to the path of movement of the holder and cooperating with said part upon relative endwise shifting of the holder and the package to bend one end of the package laterally of and away from the carton window thereby to bow the body of the package toward the window.

16. In a machine for inserting a flexible package in a carton having a window in one side wall, the combination of, means for supporting a carton open at one end in a position for filling, a holder disposed adjacent said position and mounted for movement forward into the carton through the open end thereof, said holder being adapted to receive a package and push the same endwise into the carton, and a cam on said holder disposed at an angle with respect to the path of movement of the holder and operable upon relative endwise movement between the holder and the package to bend one end of the package laterally of and away from the carton window thereby to bow the package and dispose the body of the package against the window.

17. In a machine for filling and closing cartons having four flaps at each end, the combination of, mechanism for supporting a plurality of cartons in edge to edge relation and advancing the same endwise through successive stations, a member disposed at a first one of said stations and movable back and forth to engage and fold in the trailing flap at one end of the carton at said station, a feeder disposed at said first station and operable to fill the carton through the other end, a second and similar member disposed at a second station beyond said first station and movable to engage and fold in the trailing flap at said other end of a carton at said second station, a movable support connected to both of said members and operable to move the members together to fold in the corresponding trailing flaps in unison, and means operated in timed relation to said mechanism for advancing the cartons and operable to actuate said support and thereby move said members before the cartons leave their respective stations.

18. In a machine for filling and closing cartons having flaps at each end, the combination of, mechanism for supporting a series of cartons and advancing the same along a predetermined path through a plurality of stations, a folding element disposed at one of said stations and movable in one direction to bend in one of the flaps on the carton at said station, a second folding element disposed at another station and movable in the opposite direction to bend in another flap, a frame, a member movably mounted on said frame, an actuator driven in timed relation with the advance of the cartons and operable to move said member, and a connection between said member and each of said folding elements operable to move the elements in unison but in opposite directions in response to movement of the member.

19. A machine for filling and closing a carton having four flaps at each end, said machine comprising mechanism for supporting a series of cartons and advancing the same through a succession of dwell stations disposed along a predetermined path, a magazine for storing empty cartons, a member operable during the initial part of each period of dwell of the cartons to remove a carton from said magazine and deliver the same to a first one of said stations, a folding element disposed at a subsequent station and operable when actuated to bend in a flap of the carton at that station, a continuously rotatable cam, connections between said cam and said member and between the cam and said element and operable to actuate the member and the element, and a yieldable detent engageable with the folded flap after the operation of said element to hold the flap in during the final portion of the dwell period and thereby permit the folding element to operate with the transfer member.

(References on following page)

References Cited in the file of this patent

UNITED STATES PATENTS

| | | |
|---|---|---|
| 1,277,928 | Helson | Sept. 3, 1918 |
| 1,337,845 | McGeouch et al. | Apr. 20, 1920 |
| 1,489,134 | Ladd | Apr. 1, 1924 |
| 1,603,879 | Smith et al. | Oct. 19, 1926 |
| 1,873,059 | Smith et al. | Aug. 23, 1932 |
| 2,249,201 | Ferguson | July 15, 1941 |
| 2,266,054 | Lowey | Dec. 16, 1941 |
| 2,598,569 | Levkoff | May 27, 1952 |
| 2,628,542 | Ross | Feb. 17, 1953 |
| 2,643,497 | Woelfer | June 30, 1953 |
| 2,651,896 | Woodruff | Sept. 15, 1953 |
| 2,747,348 | Rose | May 29, 1956 |